United States Patent
Sanford et al.

(10) Patent No.: US 10,826,313 B2
(45) Date of Patent: Nov. 3, 2020

(54) POWER MANAGEMENT SYSTEMS FOR PRODUCT DEMONSTRATION FIXTURES

(71) Applicant: Apple Inc., Cupertino, CA (US)

(72) Inventors: Emery A. Sanford, San Francisco, CA (US); David G. Havskjold, Sunnyvale, CA (US); Steven G. Herbst, Cupertino, CA (US); Anthony S. Montevirgen, San Francisco, CA (US); Jeffery J. Terlizzi, San Francisco, CA (US); Tyson B. Manullang, Sunnyvale, CA (US); Charles A. Schwalbach, Menlo Park, CA (US); Glenn David Henshaw, Santa Clara, CA (US); Vikas Agrawal, Santa Clara, CA (US); Soundararajan Manthiri, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1062 days.

(21) Appl. No.: 14/991,305

(22) Filed: Jan. 8, 2016

(65) Prior Publication Data

US 2016/0126761 A1 May 5, 2016

Related U.S. Application Data

(63) Continuation-in-part of application No. 14/634,145, filed on Feb. 27, 2015.
(Continued)

(51) Int. Cl.
*A47F 3/00* (2006.01)
*A47F 5/16* (2006.01)
(Continued)

(52) U.S. Cl.
CPC ............. *H02J 7/007* (2013.01); *A47F 3/005* (2013.01); *A47F 5/16* (2013.01); *A47F 7/0246* (2013.01);
(Continued)

(58) Field of Classification Search
CPC ...... H02J 7/007; G06F 1/1632; G06F 1/1633; G06F 1/263; A47F 2005/165; A47F 3/005; A47F 5/16
(Continued)

(56) References Cited

U.S. PATENT DOCUMENTS

| | | | | |
|---|---|---|---|---|
| 5,998,968 A | * | 12/1999 | Pittman | H02J 7/0093 320/130 |
| 6,184,655 B1 | * | 2/2001 | Malackowski | H02J 7/0022 320/116 |

(Continued)

*Primary Examiner* — Xuan M Thai
*Assistant Examiner* — Sadaruz Zaman
(74) *Attorney, Agent, or Firm* — Sterne, Kessler, Goldstein & Fox P.L.L.C.

(57) ABSTRACT

Power management systems for an electronic product demonstration fixture for demonstrating portable electronic devices. The product demonstration fixture may include an exhibition portion and a base portion. A portable electronic device offered for sale may be affixed to the exhibition portion. The base portion may include an electronic display, an auxiliary battery, and an auxiliary controller. The auxiliary controller may direct power from the auxiliary battery to the electronic display upon determining that a battery within the electronic display has fallen below a particular selected level. Similarly the auxiliary controller may direct power from the auxiliary battery to the portable electronic device offered for sale upon determining that a battery within the portable electronic device has fallen below a selected level.

22 Claims, 20 Drawing Sheets

Related U.S. Application Data

(60) Provisional application No. 62/048,206, filed on Sep. 9, 2014, provisional application No. 61/968,223, filed on Mar. 20, 2014, provisional application No. 61/946,691, filed on Feb. 28, 2014.

(51) Int. Cl.
  *G06F 1/16* (2006.01)
  *G06F 1/26* (2006.01)
  *H02J 7/00* (2006.01)
  *A47F 7/024* (2006.01)

(52) U.S. Cl.
  CPC .......... *G06F 1/1632* (2013.01); *G06F 1/1633* (2013.01); *G06F 1/263* (2013.01); *H02J 7/0021* (2013.01); *H02J 7/0042* (2013.01); *A47F 2005/165* (2013.01)

(58) Field of Classification Search
  USPC .......................................................... 434/379
  See application file for complete search history.

(56) References Cited

U.S. PATENT DOCUMENTS

| | | | | |
|---|---|---|---|---|
| 6,459,175 B1* | 10/2002 | Potega | .................. | B60L 11/185 307/132 M |
| 6,504,344 B1* | 1/2003 | Adams | ............... | G01R 31/3658 320/132 |
| 6,586,911 B1* | 7/2003 | Smith | .................. | G06F 1/3203 320/134 |
| 6,866,527 B2* | 3/2005 | Potega | .................. | H01R 24/58 439/218 |
| 7,075,194 B2* | 7/2006 | Weidenheimer | .......... | F41B 6/00 180/65.1 |
| 7,114,840 B2* | 10/2006 | Hamrick | ............. | G02B 6/0068 362/613 |
| 7,145,312 B2* | 12/2006 | Lanni | .................... | H02J 7/0004 320/114 |
| 7,520,072 B2* | 4/2009 | Yu | .......................... | F21V 23/04 307/66 |
| 7,804,275 B2* | 9/2010 | Dellacona | ............... | G06F 1/263 320/116 |
| 7,893,561 B2* | 2/2011 | Weidenheimer | .......... | F41B 6/00 307/71 |
| 8,030,897 B2* | 10/2011 | Anupindi | ............ | H01M 10/425 320/128 |
| 8,279,646 B1* | 10/2012 | Hamstra | .................. | H02M 3/33507 363/80 |
| 9,178,369 B2* | 11/2015 | Partovi | .................... | H02J 7/025 |
| 9,400,534 B2* | 7/2016 | Chen | ......................... | G06F 1/26 |
| 2001/0055978 A1* | 12/2001 | Herrod | .................. | G06F 1/1626 455/517 |
| 2005/0083014 A1* | 4/2005 | Baumgartner | ........ | H02J 7/0008 320/116 |
| 2006/0103353 A1* | 5/2006 | Kim | .......................... | G06F 1/26 320/128 |
| 2006/0225328 A1* | 10/2006 | Hasan | ..................... | G09F 13/18 40/570 |
| 2008/0165982 A1* | 7/2008 | Hankey | ................... | B21C 23/18 381/74 |
| 2011/0181242 A1* | 7/2011 | Lee | ........................ | H02J 7/0003 320/110 |
| 2011/0304298 A1* | 12/2011 | Gow | ......................... | H02J 1/10 320/107 |
| 2014/0191034 A1* | 7/2014 | Glanzer | ................. | G06K 7/082 235/449 |
| 2015/0357684 A1* | 12/2015 | Willgert | ................ | H01M 10/46 320/112 |

\* cited by examiner

POWER MANAGEMENT SYSTEMS FOR PRODUCT DEMONSTRATION FIXTURES

CROSS-REFERENCE TO RELATED APPLICATION(S)

This application is a continuation-in-part of U.S. patent application Ser. No. 14/634,145, filed Feb. 27, 2015, and titled "Product Demonstration Fixture for a Portable Electronic Device," which is incorporated herein in its entirety by reference thereto. U.S. patent application Ser. No. 14/634,145 claims benefit of U.S. Provisional Patent Application No. 61/946,691, filed Feb. 28, 2014, and titled "Product Demonstration Fixture for a Portable Electronic Device;" U.S. Provisional Patent Application No. 61/968,223, filed Mar. 20, 2014, and titled "Product Demonstration Fixture for a Portable Electronic Device;" and U.S. Provisional Patent Application No. 62/048,206 dated Sep. 9, 2014, and titled "Product Demonstration Fixture for a Portable Electronic Device," the disclosures of which are hereby incorporated herein in their entireties by reference thereto.

FIELD

Embodiments described herein generally relate to retail product demonstration fixtures, and more particularly, to electronic product demonstration fixtures for demonstrating portable electronic devices.

BACKGROUND

Retail customers often value handling, operating, and inspecting electronic devices they are considering for purchase. Traditionally, in-store signage and product demonstration fixtures advertise a selected set of features and capabilities of an electronic device in order to encourage a potential customer to purchase the electronic device.

In many cases, the features advertised in-store may represent only a limited subset of the available features of a particular electronic device offered for sale, which in many cases are not the most compelling features relevant to the purchase decision of a particular potential customer. Accordingly, many retail stores dedicate a number of electronic devices for in-store customer demonstration so that a potential customer may handle, operate and inspect the electronic device.

In many examples, an in-store demonstration device may be attached to a fixture with a secure tether to prevent or deter theft. For example, a metal cable permanently affixed to an electronic display table may be permanently adhered to an in-store demonstration device. In many cases, the secure tether may detract from the demonstration experience. This problem may be especially undesirable for small form factor electronic devices.

In other examples, an electronic device may include features that require communication with another electronic device. For example, a Bluetooth accessory offered for sale may require a separate electronic device, such as a cellular telephone, to operate particular features of the Bluetooth accessory. These features may be desirable to demonstrate to a potential customer considering a purchase.

Accordingly, there may be a present need for an improved electronic merchandise display for an electronic device.

SUMMARY

Embodiments described herein may relate to, include, or take the form of an electronic merchandise display for facilitating in-store demonstration of a portable electronic device offered for sale. Certain embodiments may include a base portion and an exhibition portion. The exhibition portion (which may be or include an elevating attachment or fixture) may be adapted to mechanically secure the portable electronic device to the base portion in a position and orientation suitable for in-store demonstration. The base portion may include an electronic display configured for advertising purchase information related to the portable electronic device offered for sale. The electronic display may additionally be configured for providing simulated interaction with the portable electronic device offered for sale. In many embodiments simulated or actual interaction may occur over a physical cable or other tethered connection.

Some embodiments described herein may also relate to, include, or take the form of a battery operated electronic merchandise display for facilitating in-store demonstration of a portable electronic device offered for sale. Related embodiments may include an auxiliary battery within a base portion and configured to supply power to an electronic display and the portable electronic device offered for sale. In many embodiments, the battery operated electronic merchandise display may be adapted to operate constantly during business hours of a retail store without requiring recharging. For example, the battery operated electronic merchandise display may be adapted to operate for fourteen hours without recharging, in one embodiment.

Some embodiments described herein may also relate to, include, or take the form of methods of positioning and affixing a cover glass relative to a housing. The method may include the operations of positioning the cover glass over the housing, tuning alignment adjusters such that the cover glass and the housing are flush along at least one edge, and locking the alignment adjusters in place.

Some embodiments described herein may also relate to, include, or take the form of methods of replacing a first electronic device with a second electronic device on a product demonstration fixture. The method may include the operations of removing a foot portion from a base portion housing, decoupling a first elevating attachment from the base portion, removing the first elevating attachment from the base portion, decoupling a data cable from the elevating attachment and the base portion, inserting a replacement elevating attachment and re-coupling the data cable of the base portion to the replacement exhibition portion, coupling the replacement elevating attachment to the base portion, and re-attaching the foot portion to the base portion.

Some embodiments described herein may also relate to, include, or take the form of methods of presenting an electronic device offered for sale. The method may include the operations of affixing the portable electronic device to a base portion including an electronic display, communicably coupling the base portion to the electronic device, and providing a simulated interaction between the electronic device and a portable electronic device simulated on the electronic display.

Some embodiments described herein may relate to, include, or take the form of control systems or methods for controlling the charging and/or discharging of batteries for an electronic merchandise display, or other device powered by multiple batteries. The control system or method may include a battery control system including a first charger, a second charger, a first battery connected to the first charger, a second battery connected to the first charger, a third battery connected to the second charger, and a controller configured to control the discharge of the batteries in a discharge sequence that switches connection to an electrical load between the batteries in a sequence that does not include switching directly between batteries connected to the same charger.

BRIEF DESCRIPTION OF THE DRAWINGS

Reference will now be made to representative embodiments illustrated in the accompanying figures. It should be understood that the following descriptions are not intended to limit the embodiments to one preferred embodiment. To the contrary, it is intended to cover alternatives, modifications, and equivalents as may be included within the spirit and scope of the described embodiments as defined by the appended claims.

The use of the same or similar reference numerals in different figures may indicate similar, related, or identical items.

DETAILED DESCRIPTION

Figure 1:
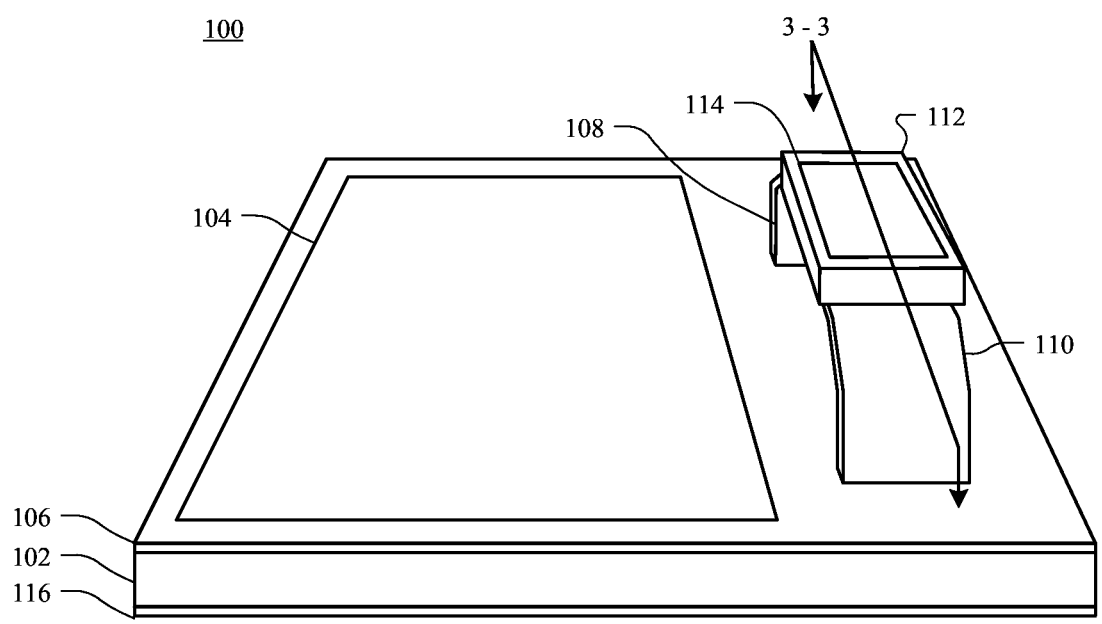
FIG. 1 depicts a front perspective view of an example product demonstration fixture for displaying and anchoring a portable electronic device.

Embodiments described herein may relate to, include, or take the form of a product demonstration fixture for facilitating in-store demonstration of a portable electronic device offered for sale.

Certain embodiments include a product demonstration fixture having a base portion and an exhibition portion. The elevating attachment may be adapted to mechanically secure the portable electronic device to the base portion in a position and orientation suitable for in-store demonstration. For example, the elevating attachment may orient the portable electronic device at a presentation angle optimized for viewing by a potential customer standing nearby an electronic display table. In one example in which the base portion, exhibition portion, or electronic device may include a partially reflective surface, the presentation angle may be selected to prevent a potential customer from being distracted by the customer's own reflection.

In certain embodiments, the base portion may include a cover. The cover may be made, for example, from a resilient and aesthetically pleasing material such as glass. The material may be selected, at least in part, based on one or more characteristics of the material that cause the material to be used for continued handling. For example, the material may be resistant to scratches, smudges, or collection of debris. The material may be selected, at least in part to include a texture that is pleasing to a potential customer. For example, in certain embodiments the material may include a low-friction surface that is adapted to allow a potential customer to easily and comfortably slide a finger across the surface.

In other examples, a high-friction surface may be desirable to discourage a user from touching certain portions of the cover. In another example, a high-friction surface may be desirable to prevent objects placed on the surface from moving along the surface. For example, a potential customer may place the potential customer's cellular phone along the cover surface. In such an example, it may be desirable to prevent the customer's phone from sliding off the cover surface, which may result in the customer's phone falling to the floor.

In this manner, any number of suitable materials and surface features may be used for the cover. One may appreciate that the type and quality of material selected for the cover may vary from embodiment to embodiment.

An optically opaque ink layer may be disposed on one or more surfaces of the cover in a pattern. For example, the ink may be disposed on a surface of the cover so as to define an aperture that is not optically obscured. This aperture may be sized to border an electronic display positioned within the base portion and below the cover. In this manner, such an aperture may be referred to as a display window.

In another example, an ink layer may be substituted for or supplemented by a colored dopant manufactured within the cover material itself. For example, the cover may incorporate a colored dopant to be partially, substantially, or entirely opaque. In such embodiments, the cover may be manufactured to include an optically transparent display window.

In many embodiments, the base portion may include an electronic display positioned below the cover and aligned with the display window. In many examples, the electronic display may include at least a processor, a display stack, and a memory. In still further examples, the electronic display may include a rechargeable battery.

In some examples, a display stack may include one or more layers of optically transparent material that may cooperatively provide for an electronically-controllable display adapted to present text, graphics, images, animations, video or other graphical elements to a potential customer. Such a display may be implemented with any suitable technology, including, but not limited to, liquid crystal display (LCD) technology, light emitting diode (LED) technology, organic light-emitting display (OLED) technology, organic electroluminescence (OEL) technology, or another type of display technology.

In other examples, the display stack may include one or more layers associated with an input device coupled to the processor. For example, one input device included within the display stack may be a touch-sensitive input device. In this manner, the display stack may take the form of a touch screen. In other examples, the input device may be a force sensor that is configured to detect a force applied to the display stack. In many examples, an input device that detects a touch or force input may be adapted to detect more than one touch of a user. In this manner, the display stack may include a multi-touch sensor so that a customer, or more than one customer, may interact with different portions of the electronic display at the same time.

The electronic display may also include a processor configured to dynamically modify the content of the display created by the display stack. In many examples, the processor can be a microprocessor, a central processing unit (CPU), an application-specific integrated circuit (ASIC), a digital signal processor (DSP), or combinations of such devices. In some embodiments, the processor can be circuitry including multiple discrete electronic components that is configured to modify the content of the display created by the display stack. In this manner, as described herein, the term "processor" is meant to encompass electronic circuitry, a single processor, multiple processors, multiple processing units, or other suitably configured computing elements adapted to affect changes to the display created by the display stack.

The electronic display may also include a memory coupled to the processor and adapted to store electronic data that can be used by the processor. For example, a memory can store electrical data or content such as, for example, audio and video files, documents and applications, device settings and user preferences, timing signals, data structures or databases, operating systems, firmware, and so on. The memory can be configured as any type of non-transitory or transitory memory such as random access memory, read-only memory, Flash memory, magnetic memory, removable memory, or other types of storage elements, or combinations of such devices.

In this manner, the processor and memory may be adapted to cooperate to dynamically vary the content of the display. For example, the processor may change the content of the display in response to instructions stored in the memory. In other examples, the processor may be adapted to vary the content of the electronic display in response to an external signal. External signals may be received by the processor wirelessly, via infra-red, or via a physical cable connection.

In certain further embodiments, the electronic display may be at least partially self-enclosed when assembled within the housing of the base. In other words, the electronic display may be a fully self-contained electronic device having a display that is entirely integrated with the base portion during assembly of the base portion. By way of example, the electronic display may be an off-the-shelf tablet computing device. In such an example, the tablet device may be removed from its housing (or otherwise manufactured without a housing), and may be integrated within the base portion during assembly of the base portion.

Further embodiments may include a removable electronic display. For example, the base portion may disassemble such that the electronic display may be removed and replaced from time to time. Some embodiments may include an electronic display that is removable without disassembling the base portion of the product demonstration fixture. For example, the base portion may include a slot or track into which the electronic display may be inserted. Later if replacement or substitution of the electronic display is required or desired, the electronic display may be removed.

Accordingly, a dynamically configurable product demonstration fixture may be formed by integrating, either temporarily or permanently, an electronic display below a cover affixed to a base portion. Thus, the product demonstration fixture may be used to advertise a plurality of features and configurations of an electronic device offered for sale.

In these and related embodiments, the product demonstration fixture may be configured to provide and present purchase information related to the portable electronic device offered for sale. Purchase information may include price, availability, configuration options, colors, accessories, compatible third party applications or devices, and the like. The product demonstration fixture may present the purchase information on the display as an image, text, animation, presentation, or any combination of the like. In many examples, the potential customer may interact with the purchase information. For example, a customer considering purchase may touch the product demonstration fixture in order to instruct the product demonstration fixture to change the information presented on the display.

Customer interaction with the product demonstration fixture may be facilitated at least in part by the processor of the electronic display. In one example, the processor may present pricing information on the display along with an instruction for the potential customer to touch an area of the display if the customer desires more information related to price. Upon receiving an indication that the potential customer has touched the area, the processor may present additional pricing information on the display of the product demonstration fixture.

In many examples, purchase information presented by the product demonstration fixture may be changed from time to time with or without interaction by a potential customer. For example, the product demonstration fixture may present pricing information for a selected period of time before changing to present product availability information. In many examples, a product demonstration fixture may be adapted to provide an aesthetically pleasing animation upon transitioning between presentations of different purchase information.

In many embodiments, the product demonstration fixture may mimic a portable electronic device that interacts with the portable electronic device offered for sale. For example, the portable electronic device offered for sale may be an accessory device such as a Bluetooth headset. The product demonstration fixture in this example may mimic a cellular telephone that is adapted to interact with the Bluetooth headset offered for sale. In such an example, the customer considering purchase may desire to experience a plurality of interaction use cases between the cellular phone and the Bluetooth accessory. In such an example, the product demonstration fixture may imitate the cellular telephone such that the potential customer may experience the process of connecting the accessory to the cellular phone prior to purchase. In other examples, the potential customer may desire to experience the interaction of the two devices during the process of receiving a telephone call or a text message, or any number of other possible interaction use cases.

The product demonstration fixture may be configured to mimic or otherwise simulate a plurality of interaction use cases with a plurality of electronic devices. For example, a potential customer considering purchase may be able to select among a plurality of cellular phones for the electronic display to mimic. For example, a user considering purchase may be presented with a menu or other graphical user interface for selecting an electronic device for the product demonstration fixture to mimic. In one example, the customer may select an electronic device that the customer is already familiar with. In this manner, the customer may be able to test and inspect various use cases of the portable electronic device offered for sale prior to purchase.

As noted above, the electronic display may, in some embodiments, be an off-the-shelf item that a potential customer may have familiarity with. In this example, the product demonstration fixture includes, and thus does not need to imitate or mimic, a portable electronic device that is configured to interact with the portable electronic device offered for sale. In such an embodiment, the electronic display may directly interact with the portable electronic device offered for sale because the electronic display is (and thus need not simulate) an electronic device configured for interaction.

To facilitate communication between the electronic display and the portable electronic device offered for sale, certain embodiments may include an auxiliary controller board within the product demonstration fixture. The auxiliary controller board may be communicably coupled to the processor of the electronic display and to the portable electronic device offered for sale. In many embodiments, the communicative coupling may be through a physical connection such as a data cable or, in some embodiments, may be through a wireless connection such as Bluetooth, Wi-Fi, or another wireless communication mechanism. In certain further embodiments, the communicative coupling between the electronic device and the auxiliary controller board may be through a combination of wireless and physical connections. For example in certain embodiments, a wireless connection may be unsuitable due to interference and latency concerns. In these examples, a wireless connection may be optionally disabled in favor of a physical connection that is not subject to interference or latency.

In some embodiments, the product demonstration fixture may be coupled to a power supply. The auxiliary controller board may distribute power from the power supply to the electronic display and to the portable electronic device offered for sale. In this manner, the auxiliary controller board may serve a secondary function of power distribution, monitoring, and management. In some examples, the power supply may be a battery or, in some embodiments, an external power supply. In many examples, the battery may be enclosed within the housing of the base of the product demonstration fixture.

In many cases, the internal battery may be recharged by connecting the product demonstration fixture to an external power supply. In other examples, the product demonstration fixture may not include an internal battery. In such a case, the auxiliary controller board may receive and distribute power from the external power supply.

As described above, the product demonstration fixture may be used by a retail store in order to demonstrate a plurality of features of a portable electronic device offered for sale. For embodiments including an internal battery within the base of the product demonstration fixture, the internal battery may be selected having a capacity equal or greater than the operating hours of a retail store.

For example, the internal batteries may be large enough to provide power to the base portion, electronic display, processor, and the portable electronic device offered for sale for twelve to fourteen hours. The recharging of the internal battery may be facilitated at least in part by the auxiliary controller board.

As noted above, the auxiliary controller board may be communicably coupled to the electronic display and to the portable electronic device offered for sale. In this manner, communication between the electronic display and portable electronic device offered for sale may be achieved. For example, communication between the two devices may be desirable during a customer-selected interaction use case.

These embodiments may include a thin data cable coupled between the auxiliary controller board and the portable electronic device offered for sale. In many examples the data cable may be at least partially concealed from the customer by the elevating attachment of the product demonstration fixture. In certain cases, the data cable may communicably couple the electronic display to the portable electronic device offered for sale via the auxiliary controller board. In this manner, the auxiliary controller board may facilitate communication between the portable electronic device offered for sale and the electronic display, such as communication related to the simulated interaction use cases described above.

For one example, to simulate an incoming phone call between a mimicked cellular phone and a Bluetooth accessory device, the electronic display may send a signal via the data cable to the accessory, instructing the Bluetooth accessory to simulate an incoming phone call. If a potential customer considering purchase interacts with the Bluetooth accessory to accept the simulated incoming call, the Bluetooth accessory may send a signal via the data cable back to the electronic display, instructing the electronic display to simulate an accepted incoming phone call on the mimicked cellular phone.

In still further examples the data cable may also be adapted to provide power to the portable electronic device offered for sale. In many examples, the auxiliary controller board may be configured to provide power to the electronic device via the data cable.

Certain further embodiments may use well-known and familiar connectors for the data cable. Still some embodiments may use the same connectors to provide all circuit-to-circuit connections within the product demonstration fixture. For example, the data cable may include a male Universal Serial Bus ("USB") connector for coupling to a circuit board associated with the auxiliary controller board. Similarly, the electronic display may couple to the same circuit board using a male USB connector.

In this manner, familiar connectors may allow for improved assembly times as well as improved repair times in both a retail and manufacturing environment. In such an example, the expertise required of a retail employee tasked with assembling a product demonstration fixture is substantially reduced. Similarly, if a retail employee is tasked with replacing or substituting the portable electronic device offered for sale associated with a particular product demonstration fixture, familiar connectors may reduce the possibility that the retail employee will require advanced training to assemble or disassemble the product demonstration fixture.

One may appreciate that although examples provided herein may relate to cellular telephones and accessory devices, other simulated interactions are contemplated and may vary from embodiment to embodiment. For example, the electronic display may be configured for mimicking or simulating a tablet computer, a personal computer, an accessory device, personal digital assistants, tablet computers, laptop computers, track pads, wearable devices, health devices, sports accessory devices, peripheral input devices, and so on.

Similarly, the portable electronic device offered for sale and affixed to the elevating attachment of the product demonstration fixture may also be a tablet computer, a personal computer, an accessory device, personal digital assistants, tablet computers, laptop computers, track pads, wearable devices, health devices, sports accessory devices, peripheral input devices, and so on.

In many examples, the portable electronic device offered for sale may be rigidly secured to the base of the product demonstration fixture with an exhibition feature. In certain embodiments, a secure fixture may rigidly couple the portable electronic device to the base portion of the product demonstration fixture. The coupling may be accomplished by any number of suitable mechanical means. For example, screws, pins, or adhesives may be used to attach the portable electronic device to the exhibition portion, which in turn may be similarly affixed to the base portion.

In certain embodiments, the elevating attachment may be permanently affixed to the base portion. In some embodiments, the elevating attachment may be removably affixed to the base portion. In such an example, an elevating attachment may be removed, substituted, or replaced from time to time.

In still further embodiments that product demonstration fixture may include an external data connection. The data connection may couple to the auxiliary controller board or to one or both of the electronic display and the portable electronic device. In certain examples, the external data connection may provide updates to the systems to which it is connected. For example, in one embodiment, a software or firmware update may be pushed via the external data connection through the auxiliary controller board to the portable electronic device offered for sale. In this manner, a display model may always include the same software experience as the portable electronic devices available for retail purchase.

In other examples, the external data connection may be adapted to update the information stored by the memory of the electronic display. For example, in certain cases, the external data connection may provide for price updates, sale information updates, availability updates, or general advertising material updates to the electronic display. In other cases, the external data connection may provide for firmware, software, or operating system updates to the electronic display. In this manner, a retail store may update each product demonstration fixture to include identical content and software.

In some embodiments, the product demonstration fixture may connect to the external data source via a wireless connection such as Bluetooth or Wi-Fi. In other examples, the product demonstration fixture may connect to the external data source via a physical connection such as a USB connection.

As with the connections internal to the product demonstration fixture described herein, many embodiments may include a familiar connector such as a USB connector in order to connect the product demonstration fixture to the external data source. In this manner, a retail employee may be capable to update the product demonstration fixture and the portable electronic device offered for sale with a single connector and without specialized training.

FIG. 1 depicts a front perspective view of an example product demonstration fixture for displaying and anchoring a portable electronic device. The product demonstration fixture 100 includes a base 102. The base 102 may include an upper layer and a bottom layer, a cover 106 and a foot 116 respectively. The cover 106 may be made from a material selected, at least in part, for its resiliency. The cover 106 may be made, for example, from a resilient and aesthetically pleasing material such as glass. The material may be selected based on one or more characteristics of the material that allow the material to be used for continued handling. For example, the material may be resistant to scratches, smudges, or collection of debris.

In many examples, an optically opaque ink layer may be disposed on one or more surfaces of the cover 106 in a pattern. For example, the ink may be disposed on a bottom surface of the cover 106 so as to define an aperture that is not optically obscured. This aperture may be sized to border an electronic display 104 positioned within the base portion and below the cover 106. In this manner, such an aperture may be referred to as a display window.

The base 102 may also include a foot 116. The foot 116 may cover entirely or partially, a bottom surface of the base 102. The foot 116 may be removably coupled to the base 102. For example, in certain embodiments, the foot 116, may be magnetically attracted to the base 102. In other examples, the foot 116 may be adhered with a removable adhesive. In still further examples, the foot 116 may be adapted to friction fit about certain surface features included within the base 102.

In many examples, the foot 116 may be made of, or include an exterior coating of, a low-friction material. For example, in certain embodiments, the base 102 may be adapted to slide about a display table such that individual customers may adjust the position of the product demonstration fixture 100. In such an embodiment, the low-friction of the foot 116 may facilitate easier sliding across the surface of the display table.

In other examples, the foot 116 may be made from, or include an exterior coating of, a high-friction material. For example, in certain embodiments, the base 102 may be adapted to substantially retain its position on a display table. In other examples, the foot 116 may be adhered or otherwise permanently affixed to a display table.

The product demonstration fixture 100 may also include an elevating attachment 108. The elevating attachment 108 may be at least partially secured to the base 102 by a retaining mechanism (not shown). In certain embodiments the elevating attachment may be at least partially obscured from the view of the customer by the portable electronic device 112 offered for sale. For example, in certain embodiments, a portable electronic device 112 may include an obscuring portion 110 that entirely or partially hides the elevating attachment 108.

In many examples, the portable electronic device 112 may include a display 114 with which a customer considering purchase may interact.

Figure 2:
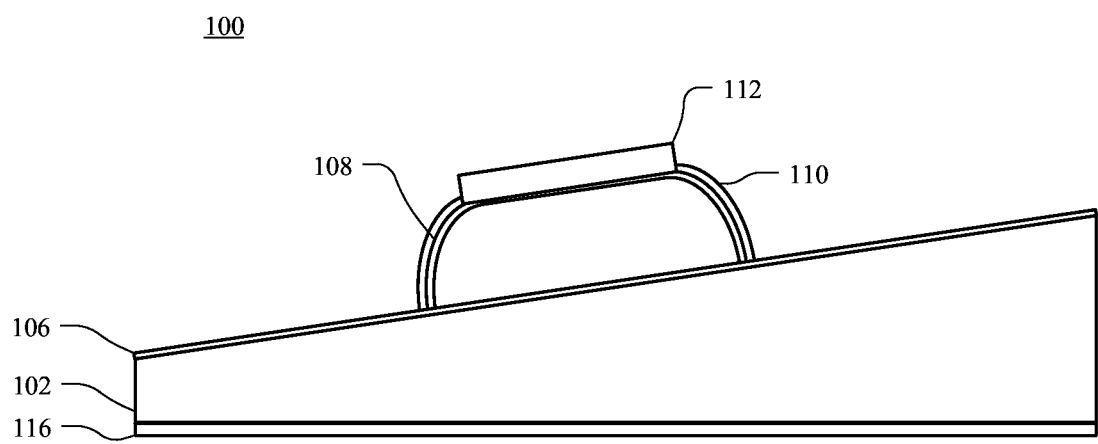
FIG. 2 depicts a side view of the example product demonstration fixture of FIG. 1.

FIG. 2 depicts a side view of the example product demonstration fixture 100 of FIG. 1. In this view the elevating attachment 108 is shown as having a substantially arcuate shape. It may be appreciated that the shape of the elevating attachment 108 may be different for different portable electronic devices 112. For example, certain embodiments may include an elevating attachment 108 with an angular, a conical, a spherical, a hemispherical, rectangular, or other suitable shape.

In many embodiments the elevating attachment 108 may be constructed from a durable metal. In further embodiments, the elevating attachment 108 may be made from an optically clear material such as acrylic or glass. In still further embodiments, the elevating attachment 108 may be solid through the cross-section 3-3 as shown in FIG. 1. For example, in lieu of an arcuate shape, the elevating attachment 108 may, in some embodiments, take a semi-circular shape. One may appreciate that a number of shapes and materials may be considered suitable for particular embodiments of the elevating attachment 108.

Figure 3:
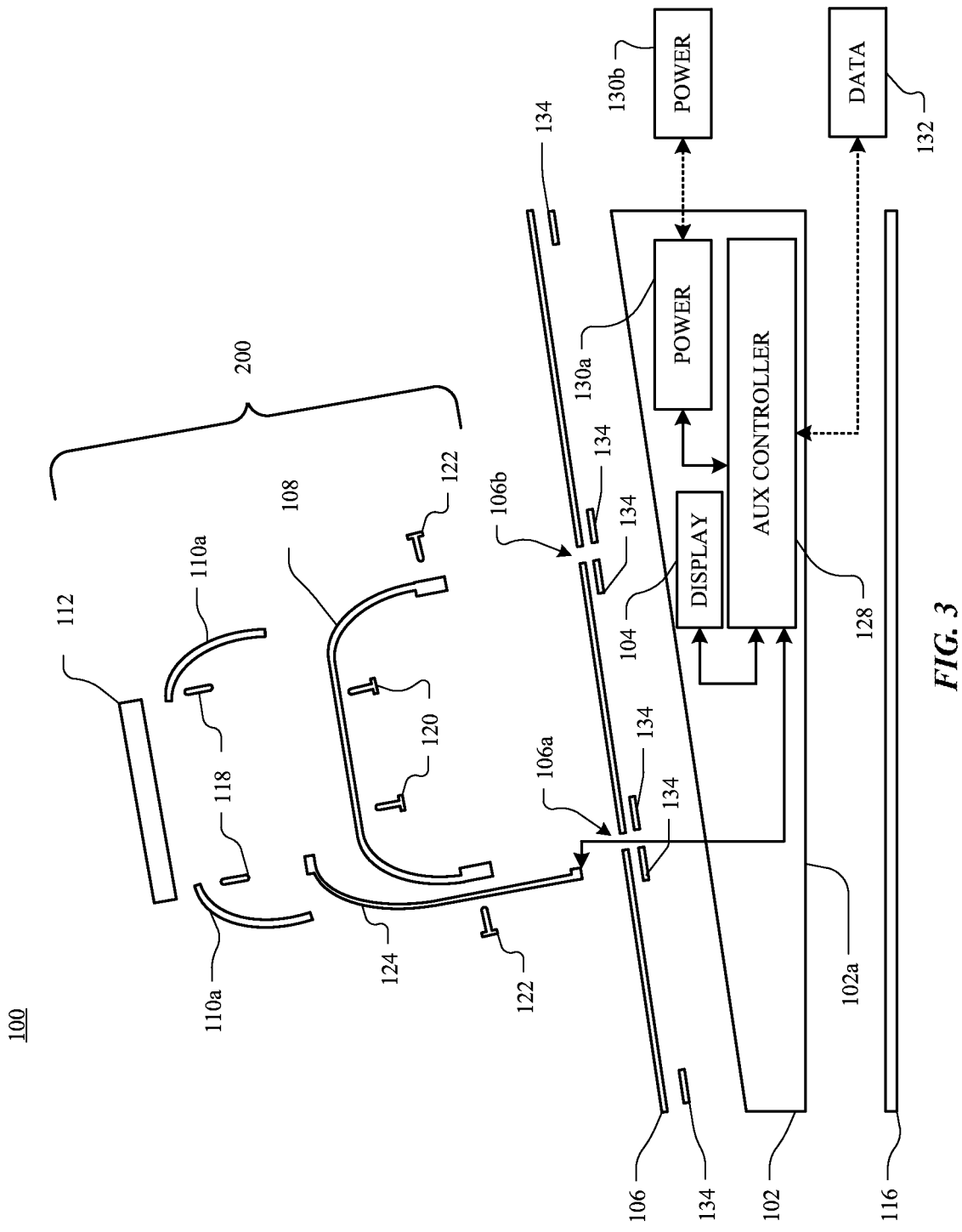
FIG. 3 depicts an exploded side view of the example product demonstration fixture of FIG. 1 taken along line 3-3.

FIG. 3 depicts an exploded side view of the example product demonstration fixture 100 of FIG. 1 taken along line 3-3. In this view, the securing mechanism of the elevating attachment 108 is shown. For example, the portable electronic device 112 may be attached to obscuring portions 110*a*, 110*b* via insertion of pins 118. In this manner, the obscuring portions 110*a*, 110*b* may be prevented from laterally detaching from the portable electronic device 112. In some embodiments, the obscuring portions 110*a*, 110*b* may be provided to aesthetically improve or otherwise obscure a data cable 124 having at least two connectors. In some embodiments, the obscuring portions 110*a*, 110*b* may be provided as an accessory feature related to the portable electronic device 112. For example, if the portable electronic device 112 offered for sale is a blood pressure monitor, the obscuring portions 110*a*, 110*b* may represent portions of the inflatable arm band. In other examples, if the portable electronic device 112 is an intelligent pet tracker, the obscuring portions 110*a*, 110*b* may represent portions of a collar.

Positioned below the obscuring portions 110*a*, 110*b* and the pins 118 may be the elevating attachment 108. The elevating attachment 108 may be secured into the portable electronic device 112 by a mechanical attachment, such as screws 120. In this manner, the elevating attachment 108 may secure the pins 118 and the obscuring portions 110*a*, 110*b* to the portable electronic device 112.

In some embodiments, a data cable 124 may be disposed between the elevating attachment 108 and an obscuring portion 110*a*. The data cable 124 may include a connector at one end that is sized to match with a data port included within the portable electronic device 112. For example, in certain embodiments, the connector may include several pogo pins which are positioned to align with several exposed contacts of the data port. Accordingly, when the screw or screws 120 are inserted through the elevating attachment 108 into the portable electronic device 112, the data cable 124 may be rigidly attached and communicably coupled to the portable electronic device 112.

In many examples, the cable 124 may be entirely hidden from the view of the customer, as it is sandwiched between the elevating attachment 108 and the obscuring portion 110*a*. Once inserted, the obscuring portions 110*a* and 110*b* may be secured to the elevating attachment 108 via screws 122.

In many examples, the obscuring portions 110*a* and 110*b* can be made from an organic material such as leather or cotton. In other cases, the obscuring portions 110*a* and 110*b* can be made from a synthetic material such as nylon or another polymer. In still further examples, the obscuring portions 110*a* and 110*b* can be made from an inorganic material such as a metal. In some examples, such as illustrated, the obscuring portions 110*a* and 110*b* may be separated from one another. In other examples, the obscuring portions 110*a* and 110*b* may be formed as a unitary element, forming a portion of a loop. In these cases, the obscuring portions 110*a* and 110*b* can extend into the product demonstration fixture 100.

The portable electronic device 112, the obscuring portion 110*a* and 110*b*, the data cable 124, and the elevating attachment 108 may be assembled together as a secure merchandise assembly 200.

In many examples, the secure merchandise assembly 200 can be assembled rigidly so that the electronic device 112 is prevented from moving relative to the product demonstration fixture 100. In other examples, however, the secure merchandise assembly 200 can be assembled with movement tolerance specifically so that the electronic device 112 can move during a product demonstration. For example, in some embodiments, the electronic device 112 can include a haptic feedback element suited to provide haptic feedback to a user of the electronic device 112. In these examples, the secure merchandise assembly 200 can be assembled so that the device can move during demonstration of the haptic feedback features of the electronic device 112.

The secure merchandise assembly 200 may, as a unit, be inserted through the cover 106 through two apertures 106*a* and 106*b*. The apertures 106*a*, 106*b* may be sized to receive a bottom portion of the secure merchandise assembly 200. Once inserted into the cover apertures, the secure merchandise assembly 200 may be screwed to the housing of the base 102 (not shown) or into a portion of a cover frame 134. The cover frame 134 may be adhered to the cover 106 with an adhesive. The cover frame 134 may be affixed to the housing of the base 102 using any suitable means such as, for example, screws, adhesive, or a combination of the like.

The base 102 may include an electronic display 104 that may be communicably coupled to an auxiliary controller board 128. The auxiliary controller board 128 may be tasked with providing both power and data via the data cable 124 to the portable electronic device 112. Similarly, the auxiliary controller board 128 may be tasked with providing both power and data to the display 104.

In some embodiments the base 102 may include an internal power source 130*a*, such as a battery pack. In many examples, the battery pack may include more than one individual battery, each of which may be rechargeable batteries. By optionally coupling the internal power source 130*a* to an external power source 130*b*, the internal power source 130*a* may be recharged.

In certain further examples the auxiliary controller board 128 may facilitate, control or otherwise regulate the charging of the internal power source 130*a*. For example, the auxiliary controller board 128 may monitor the voltage of individual cells of each individual battery pack of the internal power source 130*a* to ensure that uniform charging across all cells is accomplished. In many examples, monitoring by the auxiliary controller board 128 may be accomplished by communicably coupling the auxiliary controller board 128 to battery management units associated with each individual battery cell.

The auxiliary controller board 128 may also be optionally coupled to an external data source 132. The external data source 132 may couple to the auxiliary controller board 128 or to one or both of the electronic display 104 and the portable electronic device 112. In certain examples, the external data source 132 may provide updates to the systems to which it is connected. For example, in one embodiment, a software or firmware update may be pushed via the external data source 132 through the auxiliary controller board 128 to the portable electronic device 112. In this manner, a display model may always include the same software experience as the portable electronic devices available for retail purchase.

In other examples, the external data source 132 may be adapted to update the information stored by the memory of the electronic display 104. For example, in certain cases, the external data source 132 may provide for price updates, sale information updates, availability updates, or general advertising material updates to the electronic display. In other cases, the external data source 132 may provide for firmware, software, or operating system updates to the electronic display 104. In this manner, a retail store may update each product demonstration fixture to include identical content and software.

In some embodiments, the auxiliary controller board 128 may connect to the external data source 132 via a wireless connection such as Bluetooth or Wi-Fi. In other examples, the auxiliary controller board 128 may connect to the external data source 132 via a physical connection such as a USB connection.

In many embodiments the several electrical communication connections within the base 102 between the electronic display 104, the portable electronic device 112, the data cable 124, the auxiliary controller board 128, and the internal power supply 130 a may use well-known and familiar connectors for the data cable. For example, the data cable 124 may include a male USB connector for coupling to a circuit boarding associated with the auxiliary controller board 128. Similarly, the electronic display 104 may couple to the same circuit board using a male USB connector.

Positioned below the base 102 may be the foot 116. The foot 116 may mechanically adhere to a bottom surface 102a of the base 102. In many examples, the foot 116 may at least partially obscure a connection to the external data source 132. For example, the connection to an external data source 132 may include a data port that would be undesirable to expose to customers. Accordingly, in certain embodiments, such a data port may be positioned on the bottom surface 102a of the base 102.

Figure 4:
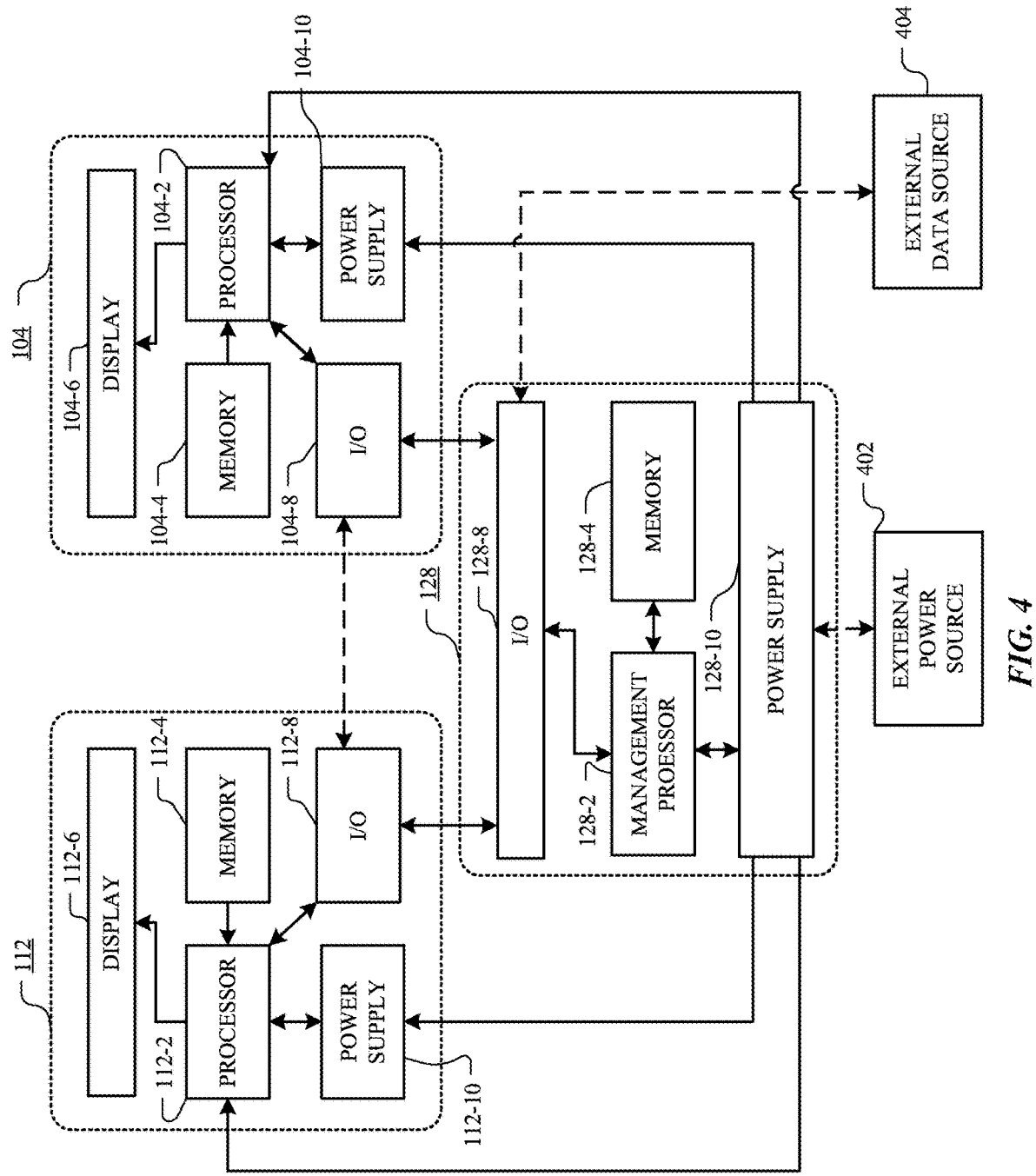
FIG. 4 depicts an example signal flow diagram of the example electronic product demonstration fixture for displaying and anchoring a portable electronic device.

FIG. 4 depicts an example signal flow diagram of the product demonstration fixture for displaying and anchoring a portable electronic device. In this signal flow diagram, the interactions between the various components of the product demonstration fixture are illustrated. For example, the electronic display 104 may include a display unit 104-6, coupled to a processor 104-2 which itself is coupled to a memory 104-4, a power supply 104-10, and an input/output mechanism 104-8.

Similarly, the portable electronic device 112 may include a display unit 112-6, coupled to a processor 112-2 which itself is coupled to a memory 112-4, a power supply 112-10, and an input/output mechanism 112-8.

The auxiliary controller board 128 may similarly include a processor 128-2 which is coupled to a memory 128-4, a power supply 128-10, and an input/output mechanism 128-8. In some embodiments, the power supply 128-10 may be coupled to an external power source 402. The external power source 402 may be an external battery or an external connection to a power transformer or power outlet. In certain examples the external connection to the external power source 402 may be made by a standard power connector, for example, a barrel connector or a magnetically-attracted pogo pin connector.

In addition, the internal power supply 128-10 may be connected to the power supplies of the display 104 and the portable electronic device 112, which are 104-10 and 112-10 respectively. In this manner, power may be transferred from the internal power supply 128-10 to the internal power supplies 104-10 and 112-10. For example, the internal power supply 128-10 may be configured to charge the internal power supplies 104-10 and 112-10.

In another embodiment, the internal power supply 128-10 may be directly connected to the processors 112-2 and 104-2. In this manner, the internal power supply 128-10 may operate both the electronic display 104 and the portable electronic device 112 even if either or both of the internal power supplies 104-10 and 112-10 are completely depleted. In this embodiment, the internal power supply 128-10 may operate as an auxiliary or backup battery.

The input/output mechanism 128-8 may be coupled to the input/output mechanisms 104-8 and 112-8 of the electronic display 104 and the portable electronic device 112. In some embodiments, the input/output mechanisms 104-8 and 112-8 of the electronic display 104 and the portable electronic device 112 may be directly coupled to one another. In this manner, the electronic display 104 and the portable electronic device 112 may communicate.

Figure 5A:
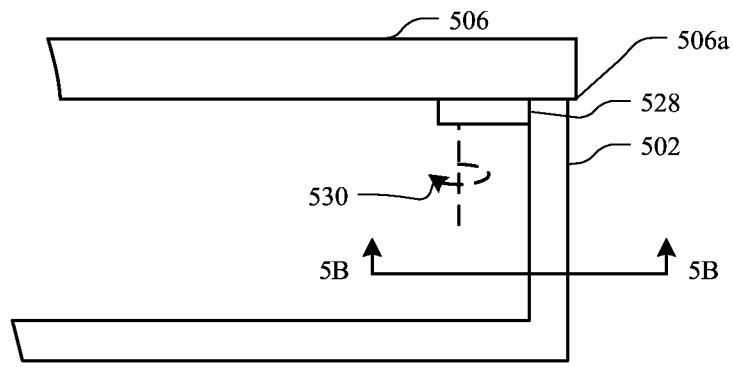
FIG. 5A depicts a side view of a portion of an example product demonstration fixture showing an alignment feature for positioning a cover glass flush with the exterior surface of the housing of the base.

FIG. 5A depicts a side view of a portion of an example product demonstration fixture showing an alignment feature 528 for positioning a cover 506 that has a misaligned area 506a (e.g., not flush) with respect to an outer surface of the base 502. In this embodiment the alignment feature 528 may be fixedly adhered to the surface of the cover 506. However, although the alignment feature 528 is adhered to the cover 506, the alignment feature 528 may be configured to rotate about an axis 530. The axis 530 may not be positioned in the center of the alignment feature 528. In this manner, when the alignment feature 528 rotates about the axis 530, it may provide a cam-action force against the housing of the base 502. In this manner, the cover 506 may pull back, slightly, in response to the cam-action force. Adjustment of the alignment feature 528 may allow the cover 506 to be carefully aligned with the outer surface of the base 502.

Figure 5B:
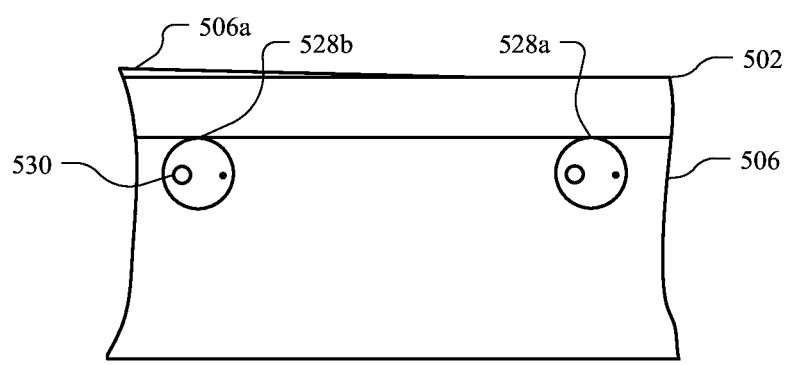
FIG. 5B depicts a bottom view of a portion of an example product demonstration fixture showing two alignment features for positioning a misaligned cover glass flush with the exterior surface of the housing of the base.
Figure 5C:
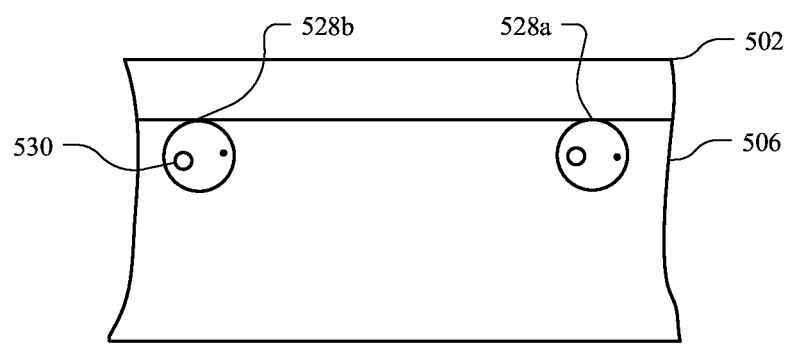
FIG. 5C depicts a bottom view of a portion of an example product demonstration fixture showing two alignment features for positioning a cover glass flush with the exterior surface of the housing of the base.

FIG. 5B depicts a bottom view taken along line 5B-5B of FIG. 5A of a portion of an example product demonstration fixture showing two alignment features for positioning a misaligned cover glass flush with the exterior surface of the housing of the base. This embodiment shows two alignment features 528a, 528b, each showing the axis of rotation 530 and one alignment fiducial. As illustrated, the alignment feature 528b may be rotated slightly toward the housing of the base 502. In this manner, the misaligned area 506a of the cover 506 adjacent to the alignment feature 528b may pull back into flush alignment with the surface of the housing of the base 502, as shown for example in FIG. 5C.

Figure 6:
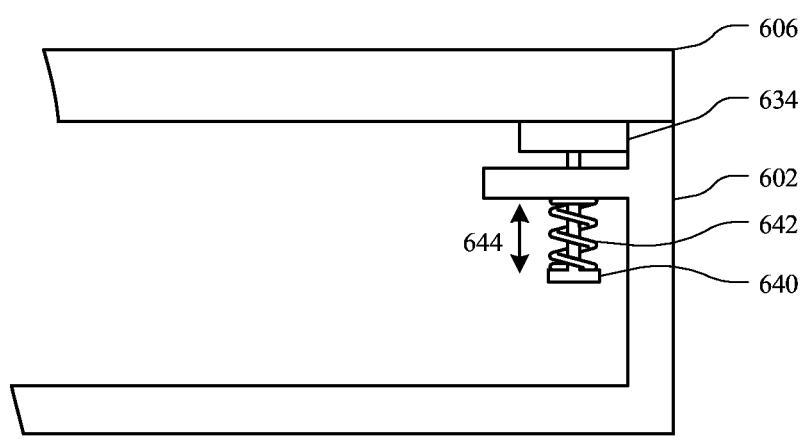
FIG. 6 depicts a side view of a portion of an example product demonstration fixture showing a retention feature for retaining a cover glass flush with the exterior surface of the housing of the base.

FIG. 6 depicts a side view of a portion of an example product demonstration fixture showing a retention feature for retaining a cover 606 flush with the exterior surface of the housing of the base. In such an embodiment a screw 640 may affix the cover 606 to the housing of the base 602 by drilling into a cover frame 634. However, over time, the screw 640 may eventually creep out of desirable tightness, potentially loosening the cover 606. A loosened cover 606 may laterally drift and may not necessarily stay flush with the housing of the base 602. Accordingly, the screw 640 may include a biasing spring 642 which may constantly provide expansive pressure 644. In this manner, even if the screw 640 loosens, the cover 606 may remain tightly coupled and flush with the housing 602.

Figure 7:
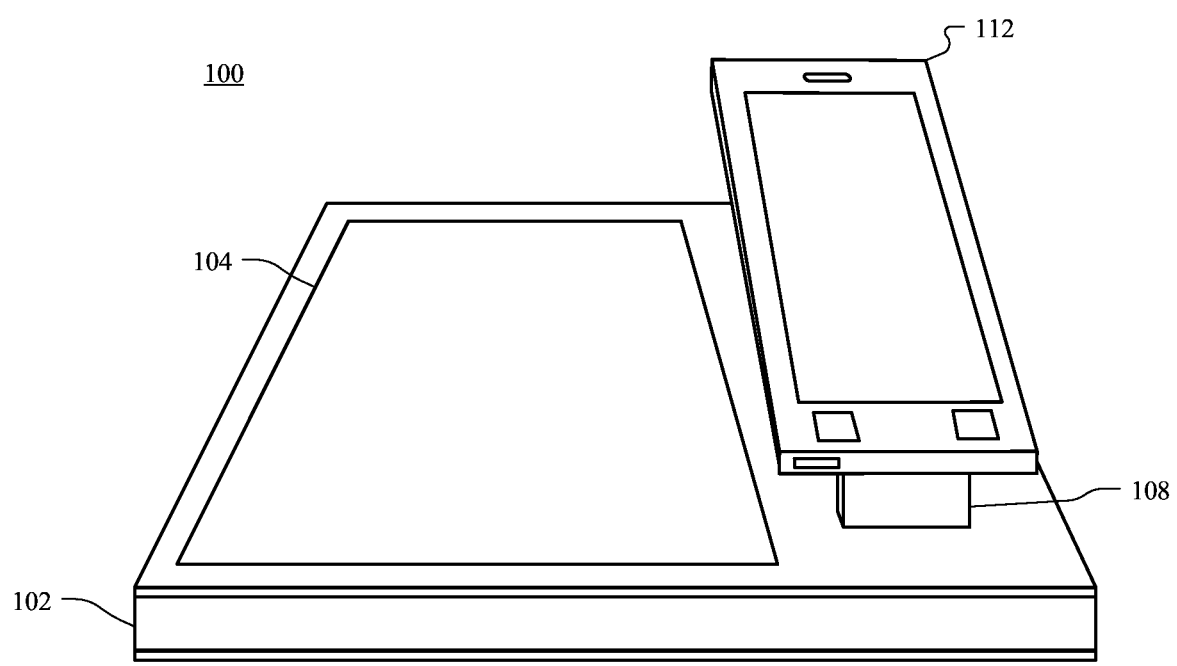
FIG. 7 depicts a front perspective view of an example product demonstration fixture for displaying and anchoring an alternate portable electronic device.

FIG. 7 depicts a front perspective view of an example product demonstration fixture 100 for displaying and anchoring an alternate portable electronic device 112, such as a cellular phone. As with the example embodiment shown in FIG. 1, the product demonstration fixture 100 includes a base 102. The base 102 may include an upper layer and a bottom layer, a cover and a foot respectively. The portable electronic device 112 may be rigidly affixed to the product demonstration fixture 100 by an elevating attachment 108. Within the elevating attachment may be included a data cable for transferring data between the product demonstration fixture 100 and the portable electronic device 112.

Figure 8:
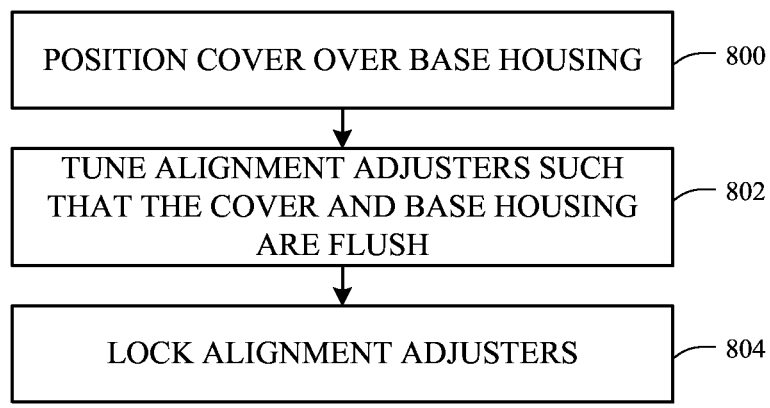
FIG. 8 depicts an example flow chart of a method of aligning a cover portion with a housing such that the cover and the housing are flush.

FIG. 8 depicts an example flow chart of a method of aligning a cover portion with a housing such that the cover and the housing are flush. The method may begin at step 800 in which a cover may be positioned over the housing. Thereafter, at 802, a plurality of alignment adjusters may be tuned such that the cover and the base are flush. Lastly at 804, the several alignment adjusters may be locked into position. In this manner, the cover may be prevented from being laterally displaced over the operational life of the relationship between the cover and the housing.

Figure 9:
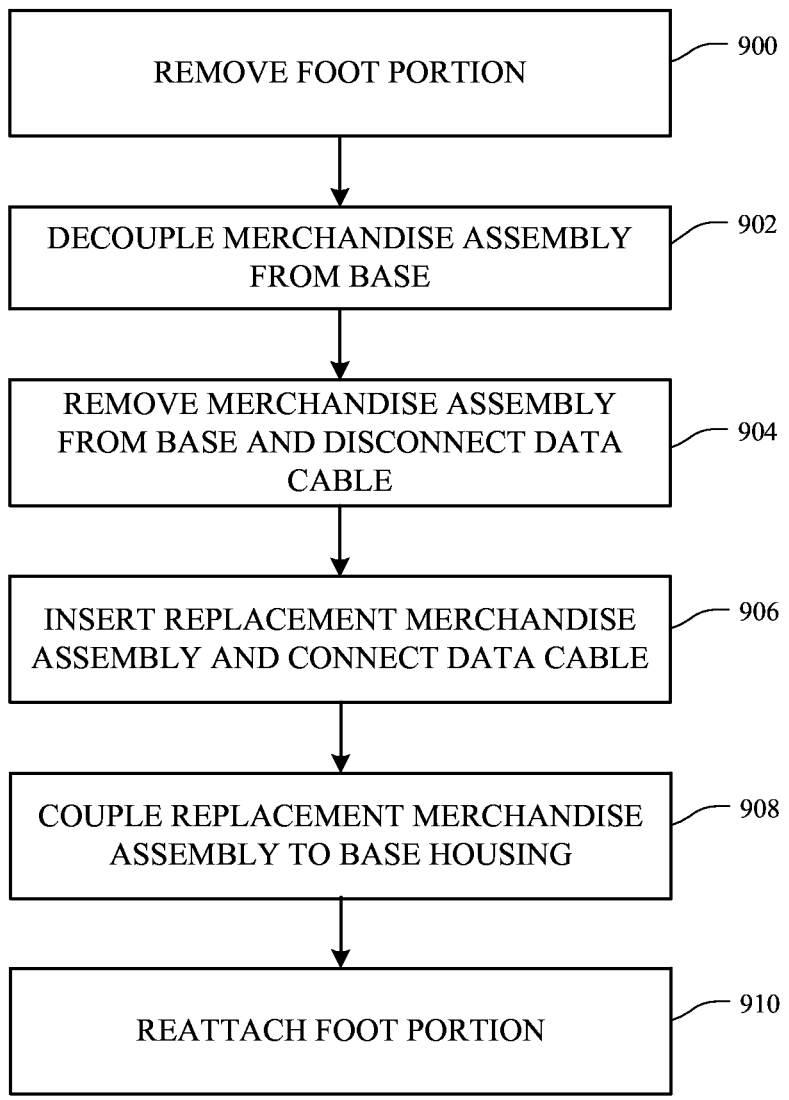
FIG. 9 depicts an example flow chart of a method of exchanging an electronic device coupled to a product demonstration fixture.

FIG. 9 depicts an example flow chart of a method of exchanging an electronic device coupled to a product demonstration fixture. The method may begin at step 900 in which a foot portion associated with the base may be removed. For example the foot portion may be adhered or otherwise attached to the base via magnetic attraction. Once the foot portion is removed, the merchandise assembly may be decoupled from the base at step 902. In many examples, removal of the merchandise assembly may be accomplished by unscrewing one or more screws affixing the merchandise assembly to the base. Next at step 904, the decoupled merchandise assembly may be removed from the base. Next, at step 906, a replacement merchandise assembly may be inserted into the space left by the first merchandise assembly. Thereafter the replacement merchandise assembly may be coupled to the base housing at 908. Lastly, at 910, the foot portion may be reattached.

Figure 10:
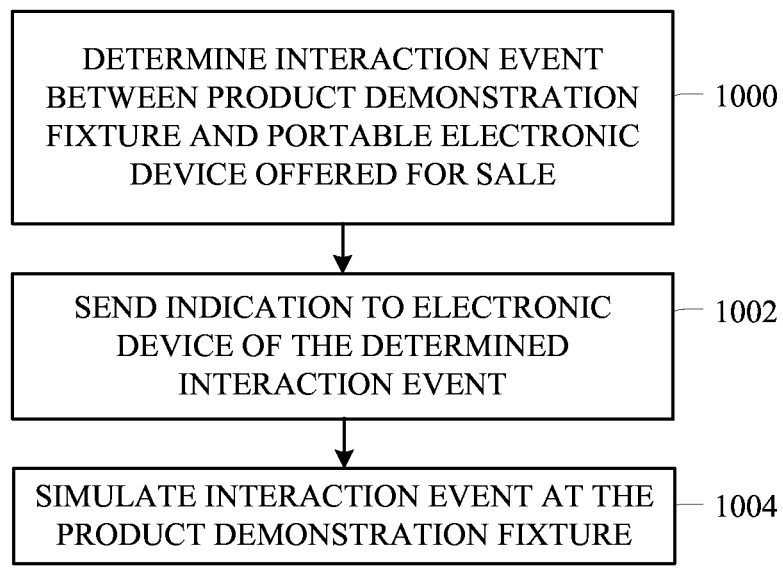
FIG. 10 depicts an example flow chart of a method of simulating interaction between an electronic device offered for sale and a second electronic device included within or simulated by a product demonstration fixture.

FIG. 10 depicts an example flow chart of a method of simulating interaction between an electronic device offered for sale and a second electronic device included within or simulated by a product demonstration fixture. The method may begin at step 1000 in which an interaction event is determined between a product demonstration fixture and a portable electronic device offered for sale. The interaction event may be a simulation of an example interaction between the two devices. Next at step 1002, an indication may be sent to the portable electronic device that a particular interaction event is desired. In this manner, the portable electronic device may demonstrate its portion of the interaction event. The method may conclude at 1004 in which the product demonstration fixture may demonstrate its portion of the interaction event.

Figure 11:
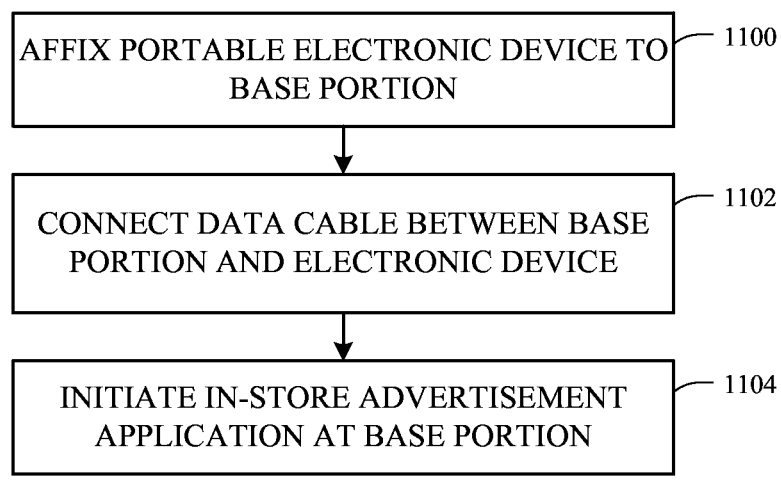
FIG. 11 depicts an example flow chart of a method of presenting an electronic device offered for sale.

FIG. 11 depicts an example flow chart of a method of presenting an electronic device offered for sale. The method may begin at 1100 by affixing a portable electronic device to a base portion of a product demonstration fixture. Next, at 1102, a data cable may be coupled between the base portion of the product demonstration fixture and the portable electronic device affixed thereto at 1100. The method may complete at 1104 in which an in-store advertisement application is initiated. For one example, a pre-recorded video or presentation may begin to play on the product demonstration fixture.

Figure 12:
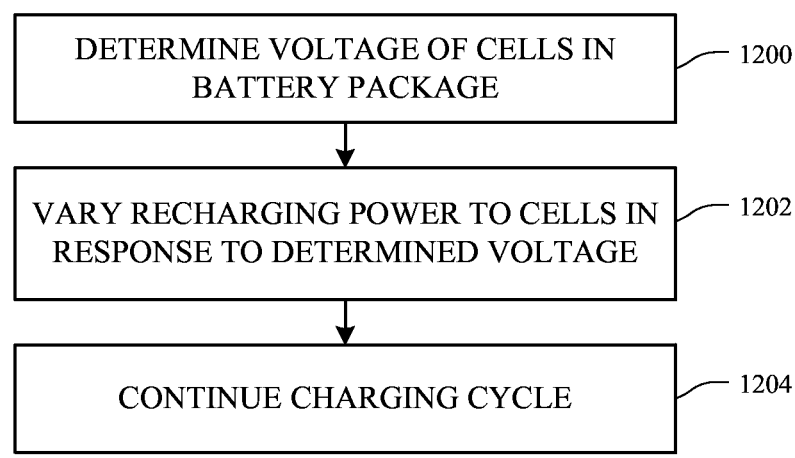
FIG. 12 depicts an example flow chart of a method of charging an auxiliary battery of a product demonstration fixture.

FIG. 12 depicts an example flow chart of a method of charging an auxiliary battery of a product demonstration fixture. The method may begin at 1200 in which the voltage or current capacity of each battery cell within each of several battery packs may be determined. For example, in certain embodiments, more than one battery pack with more than one battery cell may be included within a product demonstration fixture. A processor coupled to the battery pack may be configured for measuring the voltage presented by the included batteries. In this manner, both charging and loading of the several batteries may be distributed intelligently to prevent self-damage to individual cells.

In many examples the processor may determine that an individual cell should be charged at a higher rate or a lower rate than other cells. Accordingly, the processor may at step 1202 vary the recharging power to each of the several cells in response to the measured voltage. In these examples, such per-cell regulation of charging and discharging may improve the overall capacity of the battery pack included within the product demonstration. In certain embodiments, the product demonstration fixture may be configured for constant operation for fourteen hours or more. The process may conclude after the adjustments of step 1202 by continuing the charging cycle at 1204.

Figure 13:
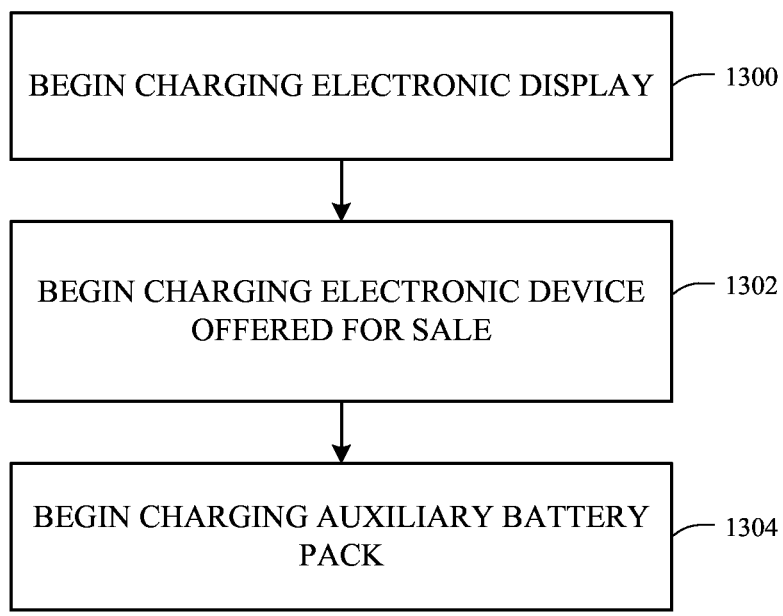
FIG. 13 depicts an example flow chart of a method of charging an auxiliary battery and an internal battery of an electronic display associated with a product demonstration fixture.

FIG. 13 depicts an example flow chart of a method of charging an auxiliary battery and an internal battery of an electronic display associated with a product demonstration fixture. Certain embodiments described herein are related to a product demonstration fixture that includes an electronic display, an auxiliary controller, and a portable electronic device offered for sale. The auxiliary controller may include a battery pack that may be used to operate both the electronic display and the portable electronic device offered for sale. In other examples, both the electronic display and the portable electronic may include batteries as well.

In these cases, at least three batteries may be present within the product demonstration fixture. In such examples, it may be desirable to charge one battery at a time. For example, in certain embodiments, the battery included within the electronic display may be charged at step 1300. Once it is determined that the battery of the electronic display is fully charged, the battery of the portable electronic device offered for sale may be charged at 1302. Once it is determined that the battery of the portable electronic device offered for sale is charged, then the auxiliary battery may be charged at 1304. During the charging of the auxiliary battery, the battery of the electronic display and the portable electronic device offered for sale may be trickle charged at the rate of self-discharge. In this manner, a product merchandising fixture may be fully charged.

In many examples, a product merchandising fixture may be charged by connecting the fixture to mains (e.g., outlet) power. In certain embodiments, connecting the fixture to mains may be accomplished using a tethered charging connection. For example, the product merchandising fixture may include a charging receptacle (e.g., charging receptacle 1506) to receive a power adapter or connector such as a barrel connector. In many embodiments, the receptacle may be hidden from the potential customer by a cover. In certain cases the cover may be sized to fit within the receptacle and sit flush with the exterior housing of the product merchandising fixture.

In some embodiments, the receptacle may be included below a removable foot of the product merchandising fixture. As described with respect to some embodiments disclosed herein, a removable foot may be adhered to a bottom surface of the product merchandising fixture. The foot portion may be adhered by magnetic attraction so as to be removable. Removal of the foot portion may expose the charging receptacle.

In still further embodiments, the charging receptacle may be another connector type separate from a barrel connector. For example, the charging receptacle may be a connector type that is common within the retail setting. For example, a retail setting for demonstrating laptop computers may include a number of adapters for charging laptop computers. In such an example, the charging receptacle of the product merchandising fixture may be compatible with the adapters otherwise used for charging laptop computers. In another example, in a retail setting for demonstration a USB device may include a number of adapters for charging via USB. In such an example, the charging receptacle of the product merchandising fixture may be USB-compatible. One may appreciate that the foregoing are merely examples of the type and sizing of the charging receptacle which may be included within a product merchandising fixture having an internal battery, and that other charging receptacles and methods are contemplated. For example, in certain embodiments, the product merchandising fixture may replenish the auxiliary battery contained therein via inductive charging.

Figure 14:
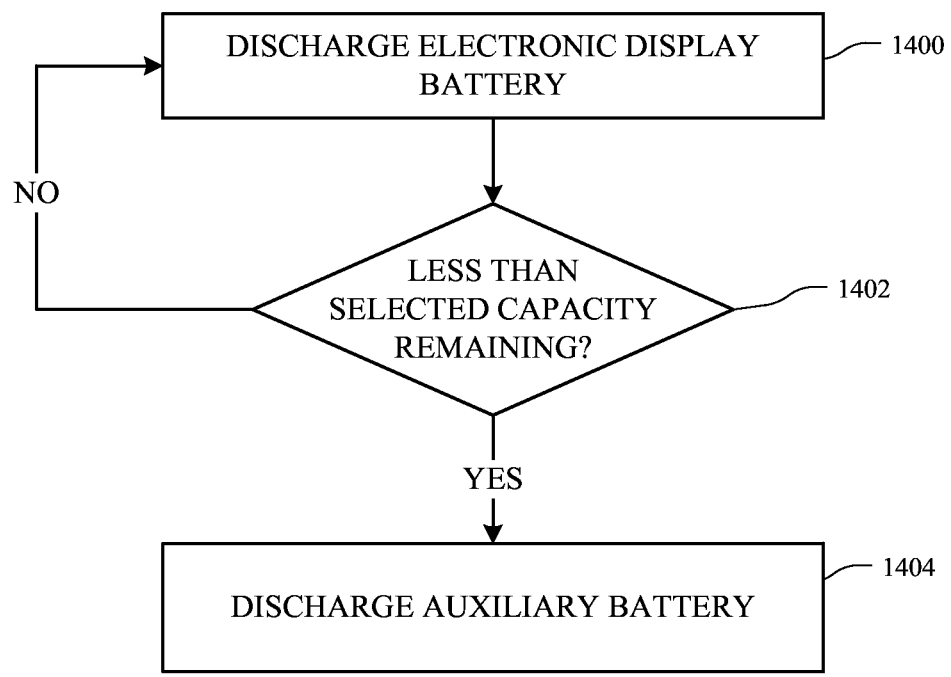
FIG. 14 depicts an example flow chart of a method of discharging an auxiliary battery and an internal battery of an electronic display associated with a product demonstration fixture.

FIG. 14 depicts an example flow chart of a method of discharging an auxiliary battery and an internal battery of an electronic display associated with a product demonstration fixture. As with FIG. 13, certain embodiments described herein relate to a product demonstration fixture that includes an electronic display, an auxiliary controller, and a portable electronic device offered for sale. The auxiliary controller may include a battery pack that may be used to operate both the electronic display and the portable electronic device offered for sale. In other examples, both the electronic display and the portable electronic may include batteries as well.

In many cases, the batteries contained within the electronic display may include a different capacity than the auxiliary battery or the battery within the portable electronic device offered for sale. Accordingly, certain embodiments may discharge smaller batteries before discharging the auxiliary battery.

For example, at step 1400 as shown in FIG. 14, the internal battery of the electronic display may be discharged before the auxiliary battery is discharged. For example, while the battery of the electronic device is discharged, a processor implementing the method may periodically determine the current power level of the battery of the electronic device at 1402. At this step, the processor may determine whether the capacity of the battery of the electronic device has fallen below a certain threshold. In certain examples, the threshold may be one percent of the full capacity of the battery.

If the battery of the electronic display falls below the threshold, the auxiliary battery may be coupled to the electronic display in order to operate the electronic display at 1404. In many embodiments, the auxiliary battery may not charge the depleted battery of the electronic display, but instead may directly power the electronic display.

A similar method may be employed between the battery of the portable electronic device offered for sale and the auxiliary battery.

In some embodiments, steps 1400 and 1404 in FIG. 14 may be reversed. In other words, while the auxiliary battery is discharged, a processor implementing the method may periodically determine the current energy level of the auxiliary battery at 1402. At this step, the processor may determine whether the capacity of the auxiliary battery has fallen below a certain threshold. Then, if the auxiliary battery falls below the threshold, the battery of the electronic display may be coupled to the electronic display in order to operate the electronic display. A similar method may be employed between the battery of the portable electronic device offered for sale and the auxiliary battery. In some embodiments the battery of the electronic display may be coupled to the portable electronic device offered for sale in order to operate the portable electronic device. In such embodiments, if the auxiliary battery falls below a certain threshold, the battery of the electronic display may be coupled to the portable electronic device offered for sale in order to operate the portable electronic device offered for sale.

The auxiliary controller may be configured to discharge batteries to provide power to an electrical load (e.g., itself and one or more other devices). In some embodiments, the auxiliary controller may be configured to control the discharge of a plurality of batteries in a discharge sequence configured to maximize the life of each battery. In some embodiments, the auxiliary controller may be configured to discharge batteries in a manner that avoids leaving batteries fully charged. In some embodiments, the auxiliary controller may be configured to discharge batteries in a manner that avoids completely discharging batteries. Leaving a battery fully charged (i.e., at approximately 100% of its charge capacity) for an extended period of time may be detrimental to the lifetime of the battery, may reduce the amount of charge (i.e., power) the battery may store, and may damage the battery's ability to recharge to 100% of its maximum charge capacity. Similarly, leaving a battery completely discharged (i.e., at approximately 0% of its charge capacity) for an extended period of time may be detrimental to the lifetime of the battery, may reduce the amount of charge (i.e., power) the battery may store, and may damage the battery's ability to recharge to 100% of its maximum charge capacity.

In some embodiments, the auxiliary controller may be configured to discharge the batteries such that no battery remains fully charged for an extended period of time. In such embodiments, the auxiliary controller may be configured to at least partially discharge each battery in a set of batteries within a predetermined time period (e.g., 1 hour). In some embodiments, the auxiliary controller may be configured to discharge the batteries such that no battery completely discharges well in advance of the other batteries. In other words, the auxiliary controller may be configured to prevent a single battery in a set of batteries from completely discharging until all the batteries in a set of batteries are discharged to a certain percentage of their full charge.

In some embodiments, the auxiliary controller may include or may be coupled to a plurality of chargers configured to charge and discharge one or more batteries in a set of batteries. In some embodiments, the auxiliary controller may control the discharge of the batteries in a discharge sequence that switches connection to an electrical load (e.g., portable electronic device 112, axillary controller board 128, and/or electronic display 104) between the batteries in a sequence that does not include switching directly between batteries connected to the same charger. Not switching directly between batteries connected to the same charger may avoid electrical shorts between batteries. In some embodiments, the auxiliary controller may be configured to leave at least one battery connected to a charger at all times so as to provide continuous power to itself and one or more other devices.

In some embodiments, the auxiliary controller may be configured to charge multiple batteries at the same time. In some embodiments, the auxiliary controller may be configured to charge batteries having different capacities at the same time. In some embodiments, the auxiliary controller may be configured to charge batteries connected in parallel at the same time. Simultaneous charging of multiple batteries may reduce the time needed to fully charge all the batteries in a set of batteries.

Figure 15:
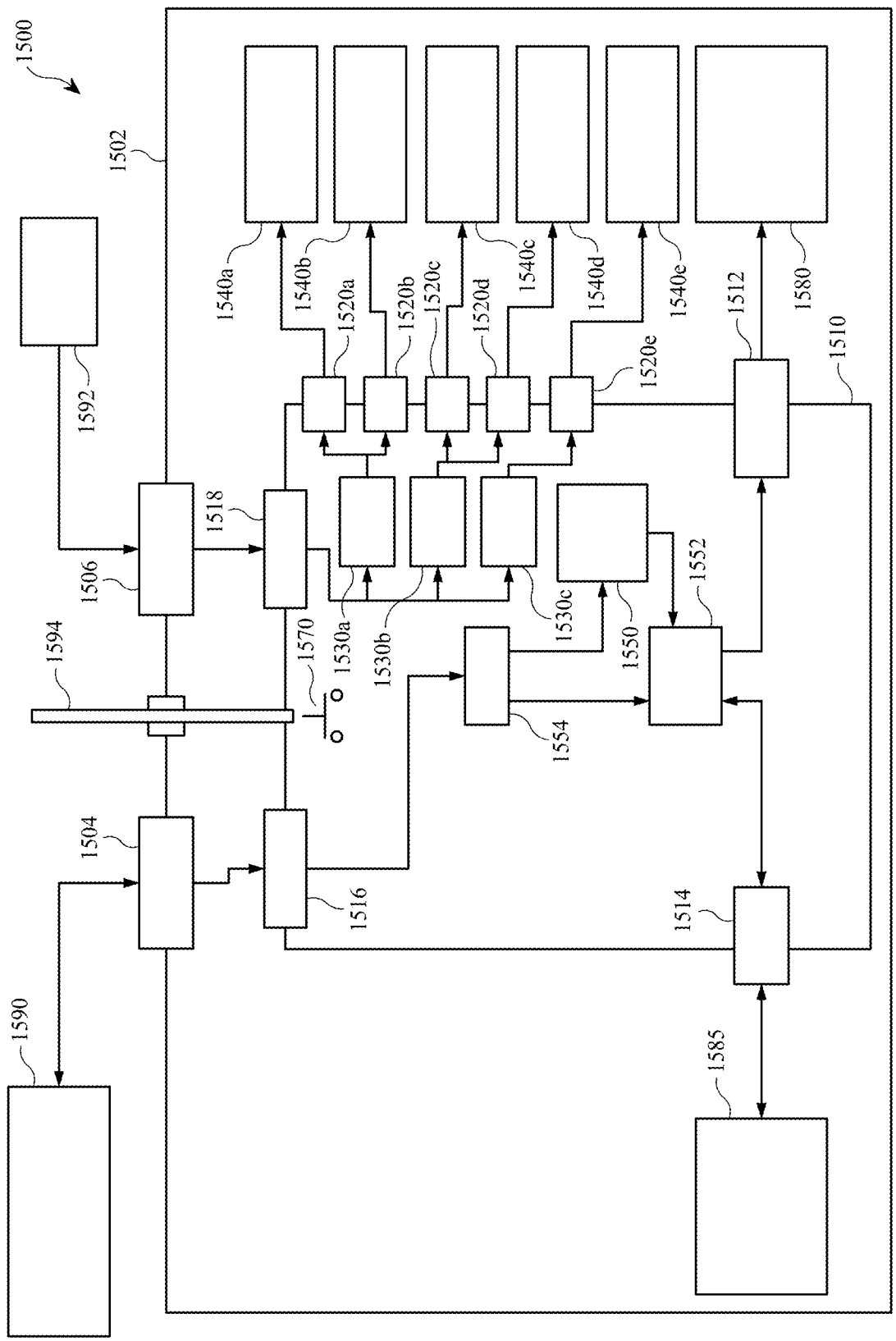
FIG. 15 shows a power management system according to an embodiment.

FIG. 15 shows a power management system (battery control system) 1500 according to an embodiment. Power management system 1500 may include an auxiliary controller board (auxiliary controller) 1510 housed within a product demonstration fixture 1502. Auxiliary controller 1510 may be configured to perform all or some of the functions of axillary controller board 128 discussed herein. Similarly, auxiliary controller board 128 may be configured to perform all or some of the functions of auxiliary controller 1510. Product demonstration fixture 1502 may be the same as or similar to product demonstration fixtures 100 or 1600 discussed herein.

Product demonstration fixture 1502 may include a charging (power) receptacle 1506 in communication with auxiliary controller 1510 and configured to couple with a power adapter or connector. Product demonstration fixture 1502 may include a data receptacle 1504 in communication with auxiliary controller 1510 and configured to couple with a data plug or connector. In some embodiments, charging receptacle 1506 and/or data receptacle 1504 may be configured to receive/transmit both power and data (e.g., either receptacle may be a Universal Serial Bus ("USB") receptacle). In some embodiments, data receptacle 1504 may be a wireless data receptacle (e.g., a Bluetooth® receiver or Wi-Fi receiver).

Auxiliary controller 1510 may include a plurality of connectors 1512, 1514, 1516, 1518, and 1520 for transmitting and/or receiving power and/or data to and/or from other devices. Each connector 1512, 1514, 1516, 1518, and 1520 may be a board-to-board connector or a wire-to-board connector. Each connector 1512, 1514, 1516, 1518, and 1520 may be but is not limited to a A/C or D/C power connector, a USB connector, micro-USB connector, mini-USB connector, Ethernet (e.g., Cat 5) connector, or any other standard or proprietary connection format. In some embodiments, one or more connectors 1512, 1514, 1516, 1518, or 1520 may be a wireless data connector (e.g., a Bluetooth® receiver or Wi-Fi receiver).

Connector 1512 may be configured for communication with a portable electronic device 1580 supported by product demonstration fixture 1502. Portable electronic device 1580 may be but is not limited to a cellphone, a tablet computer, a laptop, or a watch. Connector 1514 may be configured for communication with an internal controller 1585 of product demonstration fixture 1502. Internal controller 1585 may perform all or some of the functions of electronic display 104 described herein. In some embodiments, internal controller 1585 may be a tablet computer (e.g., a commercially available tablet, such as an iPad, or a modified version of a commercially available tablet).

Connector 1516 may be configured for communication with an external controller 1590 coupled to product demonstration fixture 1502 (e.g., via data receptacle 1504). External controller 1590 may be but is not limited to a server or a local computer (e.g., a laptop or tablet). Connector 1518 may be configured for communication with a power source 1592 (e.g., via charging receptacle 1506). Power source 1592 may be but is not limited to a power outlet (e.g., 120V or 220V wall outlet) or a battery. Connectors 1520 may be configured for communication with batteries 1540. Each battery 1540 may be any suitable battery, including but not limited to batteries 1710, 1720, and 1730 discussed herein.

Auxiliary controller 1510 may include one or more chargers 1530. Auxiliary controller 1510 may control charging and discharging of one or more batteries 1540 via chargers 1530. In some embodiments, chargers 1530 may be battery charger integrated circuits on the same printed circuit board as a microcontroller 1550 of auxiliary controller 1510. In some embodiments, chargers 1530 may monitor the charge levels of batteries 1540. Each charger 1530 may be coupled to one or more batteries 1540 via a connector 1520. Chargers 1530 may be configured to charge or allow discharge of each battery 1540 to which it is connected. In some embodiments, all or some of chargers 1530 may be separate components coupled to auxiliary controller 1510 via a connector (e.g., a USB connector).

Power management system 1500 may include any suitable number of batteries 1540 connected to any suitable number of chargers 1530. In some embodiments, power management system 1500 may include "M" number of batteries 1540 connected to "N" number of chargers 1530, where "M" is greater than or equal to "N." In some embodiments, some or all of chargers 1530 may be coupled to two or more batteries 1540. In some embodiments, power management system 1500 may include batteries 1540 having different capacities. Batteries 1540 connected to the same charger 1530 may be connected in parallel. Batteries 1540 connected to different chargers 1530 may be connected in parallel. While FIG. 15 shows five batteries 1540a-e as separate from internal controller 1585, one of the five batteries 1540a-e may be the battery of an internal controller 1585. Alternatively, the battery of internal controller 1585 may be an additional battery within a power management system.

In some embodiments, power management system 1500 may include a first charger 1530a connected to a first battery 1540a and a second battery 1540b, and a second charger 1530b connected to a third battery 1540c. Further, in some embodiments, a fourth battery 1540d may be connected to second charger 1530b and a fifth battery 1540e may be connected to a third charger 1530c. In such embodiments, first battery 1540a and second battery 1540b may be connected in parallel, third battery 1540c and fourth battery 1540d may be connected in parallel, and the remainder of the connections between respective batteries 1540 may be in parallel. In some embodiments, additional batteries 1540 and chargers 1530 may be added to power management system 1500 in the manner described for batteries 1540a-e and chargers 1530a-c (i.e., a sixth battery may be connected to third charger 1530c, and so on).

Chargers 1530 may include multiple connection ports configured to connect to multiple connectors 1520. Also, chargers 1530 may include a switchable connection mechanism configured to activate/deactivate connection ports connected to respective connectors 1520. For example, charger 1530 may include two connection ports configured to connect to connectors 1520a and 1520b, respectively. In some embodiments, auxiliary controller 1510 may be configured to control a switchable connection mechanism of a charger (e.g., charger 1530*a*) to connect different connectors (e.g., connectors 1520*a* and 1520*b*), and therefore different batteries, to a charger at different times.

Auxiliary controller 1510 may control chargers 1530 to control the charging and discharging of batteries 1540. The discharging of batteries 1540 powers one or more electrical loads (e.g., auxiliary controller 1510, portable electronic device 1580, and/or internal controller 1585). In some embodiments, auxiliary controller 1510, portable electronic device 1580, and internal controller 1585 may, together, be referred to as a single electrical load. When charging batteries, power may be received from one or more sources. For example, power may be received from an external power source (i.e., a source of power not contained within product demonstration fixture 1502), such as power source 1592 or external controller 1590.

Auxiliary controller 1510 may control the discharge of batteries 1540 in a discharge sequence that switches connection to an electrical load between the batteries 1540 in a sequence that does not include switching directly between batteries 1540 connected to the same charger 1530. For example, in a power management system 1500 including at least three batteries 1540 and at least two chargers 1530, the discharge sequence may include, in order: connecting a first battery 1540*a* to an electrical load through a first charger 1530*a*, connecting a third battery 1540*c* to the electrical load through a second charger 1530*b*, and then disconnecting the first battery 1540*a* from the electrical load, connecting a second battery 1540*b* to the electrical load through the first charger 1530*a*, and then disconnecting the third battery 1540*c* from the electrical load, and connecting the third battery 1540*c* to the electrical load through the second charger 1530*b*, and then disconnecting the second battery 1540*b* from the electrical load. This discharge sequence may start over by connecting the first battery 1540*a* again and then disconnecting the third battery 1540*c*, and this sequence may be repeated as many times as needed to provide power to the electrical load.

As another example, in a power management system 1500 including at least four batteries 1540 and at least two chargers, the discharge sequence may include, in order: connecting a first battery 1540*a* to an electrical load through a first charger 1530*a*, connecting a third battery 1540*c* to the electrical load through a second charger 1530*b*, and then disconnecting the first battery 1540*a* from the electrical load, connecting a second battery 1540*b* to the electrical load through the first charger 1530*a*, and then disconnecting the third battery 1540*c* from the electrical load, and connecting a fourth battery 1540*d* to the electrical load through the second charger 1530*b*, and then disconnecting the second battery 1540*b* from the electrical load. This discharge sequence may start over by connecting the first battery 1540*a* again and then disconnecting the fourth battery 1540*d*, and this sequence may be repeated as many times as needed to provide power to the electrical load.

As another example, in a power management system 1500 including at least five batteries 1540 and at least three chargers 1530, the discharge sequence may include, in order: connecting a first battery 1540*a* to an electrical load through a first charger 1530*a*, connecting a third battery 1540*c* to the electrical load through a second charger 1530*b*, and then disconnecting the first battery 1540*a* from the electrical load, connecting a second battery 1540*b* to the electrical load through the first charger 1530*a*, and then disconnecting the third battery 1540*c* from the electrical load, connecting a fourth battery 1540*d* to the electrical load through the second charger 1530*b*, and then disconnecting the second battery 1540*b* from the electrical load, and connecting a fifth battery 1540*e* to the electrical load through a third charger 1530*c*, and then disconnecting the fourth battery 1540*d* from the electrical load. This discharge sequence may start over by connecting the first battery 1540*a* again and then disconnecting the fifth battery 1540*e*, and this sequence may be repeated as many times as needed to provide power to the electrical load.

In some embodiments, the switching between batteries 1540 in a discharge sequence may occur after a battery 1540 connected to the electrical load has drained a predetermined charge amount (e.g., a certain number of coulombs). In some embodiments, the switching between batteries 1540 in a discharge sequence may occur after a battery 1540 connected to the electrical load has drained a predetermined percentage of its charge. In some embodiments, a predetermined percentage of a respective battery's charge may be a percentage of its maximum charge capacity. In such embodiments, the predetermined percentage may be, for example, 5%, 10%, 25%, or 33% of a respective battery's maximum charge capacity. In some embodiments, a predetermined percentage of a respective battery's charge may be a percentage of the battery's remaining energy. In such embodiments, the predetermined percentage may be, for example, 5%, 10%, 25%, or 33% of a respective battery's remaining energy. Switching between batteries 1540 in a discharge sequence after a battery has drained a predetermined charge amount or percentage may avoid leaving any of batteries 1540 fully charged for an extended period of time. Further, switching between batteries 1540 in this way may avoid completely discharging any of batteries 1540 well in advance of the other batteries 1540 (i.e., may reduce the time one or more batteries 1540 remain completed discharged).

In some embodiments, a discharge sequence may be repeated during the discharge of batteries 1540 and each battery 1540 may be drained by the same percentage during each repetition of the discharge sequence. In some embodiments, a discharge sequence may be repeated during the discharge of batteries 1540 and one or more batteries 1540 may be drained by different percentages during each repetition of the discharge sequence.

In some embodiments, auxiliary controller 1510 may be configured to control the charging of batteries 1540 in power management system 1500. Auxiliary controller 1510 may be configured to charge batteries 1540 with power received from a power source (e.g., power source 1592). In some embodiments, auxiliary controller 1510 may be configured to charge multiple batteries 1540 at the same time. In some embodiments, auxiliary controller 1510 may be configured to charge batteries 1540 connected to different chargers 1530 at the same time. For example, in an embodiment including the first battery 1540*a* and the second battery 1540*b* connected to the first charger 1530*a*, and the third battery 1540*c* connected to second charger 1530*b*, auxiliary controller 1510 may be configured to charge the first battery 1540*a* and the third battery 1540*c* at the same time.

In some embodiments, auxiliary controller 1510 may be configured to control the charging of batteries 1540 in a charging sequence. In some embodiments, the charging sequence may include charging multiple batteries 1540 connected to different chargers 1530 (i.e., a first set of batteries 1540) at the same time with power from a power source, discontinuing the charging of the first set of batteries 1540 by disconnecting the first set of batteries 1540 from the power source. Then, after disconnecting the first set of batteries 1540, charging other batteries 1540, different from the first set of batteries, connected to different chargers (i.e., a second set of batteries 1540) at the same time with power from the power source. For example, in an embodiment including the first battery 1540a, the second battery 1540b, the third battery 1540c, and the fourth battery 1540d, auxiliary controller 1510 may control charging of the batteries 1540 in a charging sequence that includes: (1) connecting the first battery 1540a to a power source through the first charger 1530a and connecting the third battery 1540c to the power source through the second charger 1530b, (2) allowing the first battery 1540a and the third battery 1540c to charge, (3) disconnecting the first battery 1540a and the third battery 1540c (i.e. the first set of batteries) from the power source, (4) connecting the second battery 1540b to the power source through the first charger 1530a and connecting the fourth battery 1540d to the power source through the second charger 1530b, (5) allowing the second battery 1540b and the fourth battery 1540d to charger, and (6) disconnecting the second battery 1540b and the fourth battery 1540d (i.e., the second set of batteries) from the power source. This charging sequence may start over by connecting the first battery 1540a and the third battery 1540c again, and this sequence may be repeated as many times as needed to charge batteries 1540a, 1540b, 1540c, and 1540d. In some embodiments, auxiliary controller 1510 may disconnect batteries 1540 (e.g., sets of batteries 1540) in a charging sequence after a battery connected to a power source has charged to a predetermined charge amount (e.g., 25%, 50%, 75%, or 100% of a respective battery's maximum charge capacity).

In some embodiments, a charging sequence may be repeated during the charging of batteries 1540 and each battery 1540 may be charged by the same percentage during each repetition of the charging sequence. In some embodiments, a charging sequence may be repeated during the charging of batteries 1540 and one or more batteries 1540 may be charged by different percentages during each repetition of the discharge sequence.

Auxiliary controller 1510 may monitor the charge levels (e.g., charge amounts and/or percentages) of respective batteries 1540 in power management system 1500 and control the switching of batteries 1540 during a discharge sequence based the amounts and/or percentages of respective batteries 1540. Charge amount and/or percentages may be received from printed circuit boards associated with different batteries (e.g., printed circuit boards 1714, 1724, and 1734). In some embodiments, auxiliary controller 1510 may be configured to control the charge levels of batteries 1540 (i.e., control the discharge of the batteries) such that the charge levels of each battery 1540 remain within a predetermined amount of percentage points of each other throughout a discharge sequence. In some embodiments, the predetermined amount of percentage points may be 10 percentage points. In some embodiments, auxiliary controller 1510 may be configured to recognize when a battery is defective and/or broken (e.g., by monitoring charge levels). In such embodiments, auxiliary controller 1510 may be configured to skip a defective/broken battery in a discharge sequence and/or charge sequence, or to connect to the defective/broken battery in its usual sequence without providing charge to the defective/broken battery.

In some embodiments, auxiliary controller 1510 may include a microcontroller (MCU) 1550 including a processor, memory, and programmable input/output peripherals. MCU 1550 may be configured to control the functions of auxiliary controller 1510. MCU 1550 may be configured to control charging/discharging of batteries 1540 through chargers 1530. In some embodiments, MCU 1550 may be configured to monitor the charge levels of batteries 1540.

In some embodiments, auxiliary controller 1510 may include one or more hubs 1552/1554 for coupling devices to auxiliary controller 1510. In some embodiments, auxiliary controller may include two hubs 1552 and 1554 for coupling different devices to auxiliary controller 1510. Hubs 1552 and 1554 may be controlled by MCU 1550.

In embodiments including two hubs 1552 and 1554, hubs 1552 and 1554 may be configured to allow either an external device (e.g., external controller 1590) or an internal device (e.g., internal controller 1585) to be a host device for portable electronic device 1580 while allowing external controller 1590 to act as the host for microcontroller 1550 (i.e., the processor for auxiliary controller 1510). In such embodiments, hub 1552 may be connected to portable electronic device 1580, internal controller 1585, and hub 1554; and hub 1554 may be connected to microcontroller 1550, external controller 1590, and hub 1552. The use of two hubs 1552 and 1554 may allow microcontroller 1550 to receive commands (e.g., software or firmware updates) regardless of which controller (internal controller 1585 or external controller 1590) is acting as a host device for portable electronic device 1580. Further, two hubs 1552 and 1554 may allow external controller 1590 to communicate with microcontroller 1550 while internal controller 1585 is also communicating with portable electronic device 1580. This may allow debugging of power management system 1500 while internal controller 1585 is in communication with portable electronic device 1580.

In some embodiments, auxiliary controller 1510 may include a button 1570. Button 1570 may be, for example, a mechanical button (e.g., spring-loaded button) or a capacitive touch button (e.g., capacitive touch sensor). A user may manually interact with auxiliary controller 1510 (e.g., send manual commands to auxiliary controller 1510) by actuating button 1570. In some embodiments, a tool 1594 (e.g., a SIM ("subscriber identity module") card tool) may be used to actuate button 1570. In some embodiments, button 1570 may be located on auxiliary controller 1510. In some embodiments, button 1570 may be a separate component coupled to auxiliary controller 1510 (e.g., via a flex cable).

In some embodiments, button 1570 may be configured to relay contact signals to auxiliary controller 1510 (e.g., similar to Morse code signals). For example, two consecutive contacts with button 1570 may signal a first operation (e.g., powering down product demonstration fixture 1502), or continuous contact with button 1570 for a predetermined about of time (e.g., five seconds) may signal a second operation (e.g., resetting product demonstration fixture 1502). Other commands that may be relayed via various patterns of actuating button 1570 include but are not limited to, resetting internal controller 1585 and/or portable electronic device 1580, shutting down internal controller 1585 and/or portable electronic device 1580, or sending a "sleep" command to internal controller 1585 and/or portable electronic device 1580.

Figure 16:
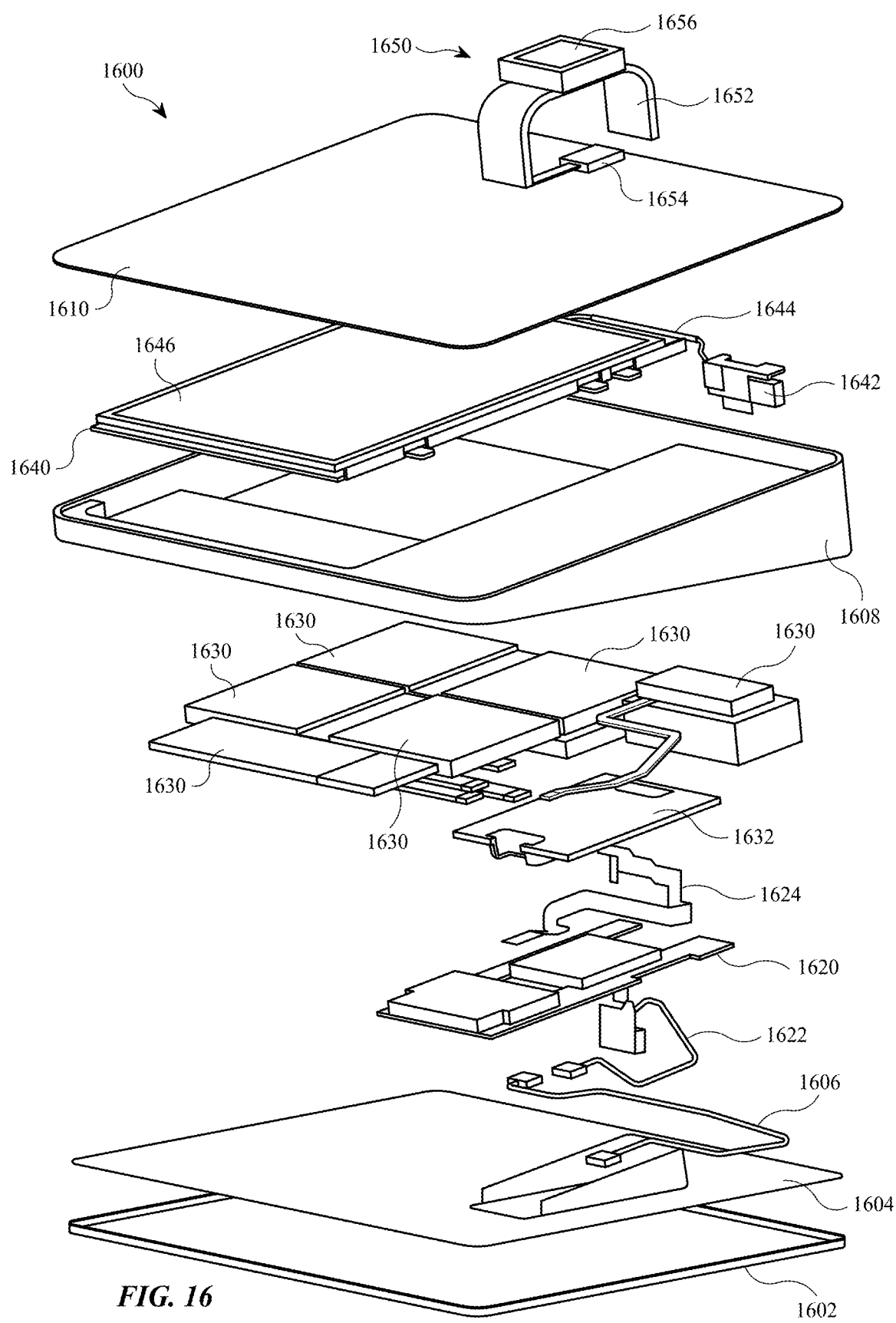
FIG. 16 shows an exploded view of a product demonstration fixture according to an embodiment.

FIG. 16 shows an exploded view of a product demonstration fixture 1600 according to an embodiment. Product demonstration fixture 1600 may include a foot 1602, a base plate 1604, a base 1608, and a cover 1610 defining an internal cavity (e.g., internal cavity 1706) for housing components of product demonstration fixture 1600 (e.g., batteries 1630, auxiliary controller 1620, etc.). In some embodiments, product demonstration fixture 1600 may include a pass-through cable 1606 for connecting auxiliary controller 1620 to an external power source. In some embodiments, product demonstration fixture 1600 may include a cable 1622 for coupling pass-through cable 1606 to auxiliary controller 1620.

In some embodiments, product demonstration fixture 1600 may include a dock flex cable 1624 for allowing auxiliary controller 1620 to be connected to an external device (e.g., external controller 1590). In some embodiments, product demonstration fixture 1600 may include a battery plate 1632 for supporting batteries 1630 within product demonstration fixture 1600. Each battery 1630 may be any suitable battery, including but not limited to batteries 1710, 1720, and 1730 discussed herein.

Product demonstration fixture 1600 may include an internal controller 1640. Internal controller 1640 may perform all or some of the functions of electronic display 104 described herein. In some embodiments, internal controller 1640 may be a tablet computer (e.g., a commercially available tablet, such as an iPad or a modified version of a commercial available tablet). Internal controller 1640 may include an antenna 1642 coupled to internal controller 1640 via an antenna flex cable 1644. Antenna 1642 may be, but is not limited to a Bluetooth and/or Wi-Fi antenna. Similar to electronic display 104, internal controller 1640 may include a display screen 1646 (e.g., a liquid crystal display (LCD), a light emitting diode (LED) display, or organic light-emitting diode (OLED) display).

Product demonstration fixture 1600 may include a merchandise assembly 1650 the same as or similar to merchandise assembly 200 for supporting a portable electronic device 1656. In some embodiments, merchandise assembly 1650 may include an elevating attachment 1652 for supporting portable electronic device. In some embodiments, product demonstration fixture 1600 may include a merchandise flex cable 1654 for connecting portable electronic device 1656 to auxiliary controller 1620.

Figure 17:
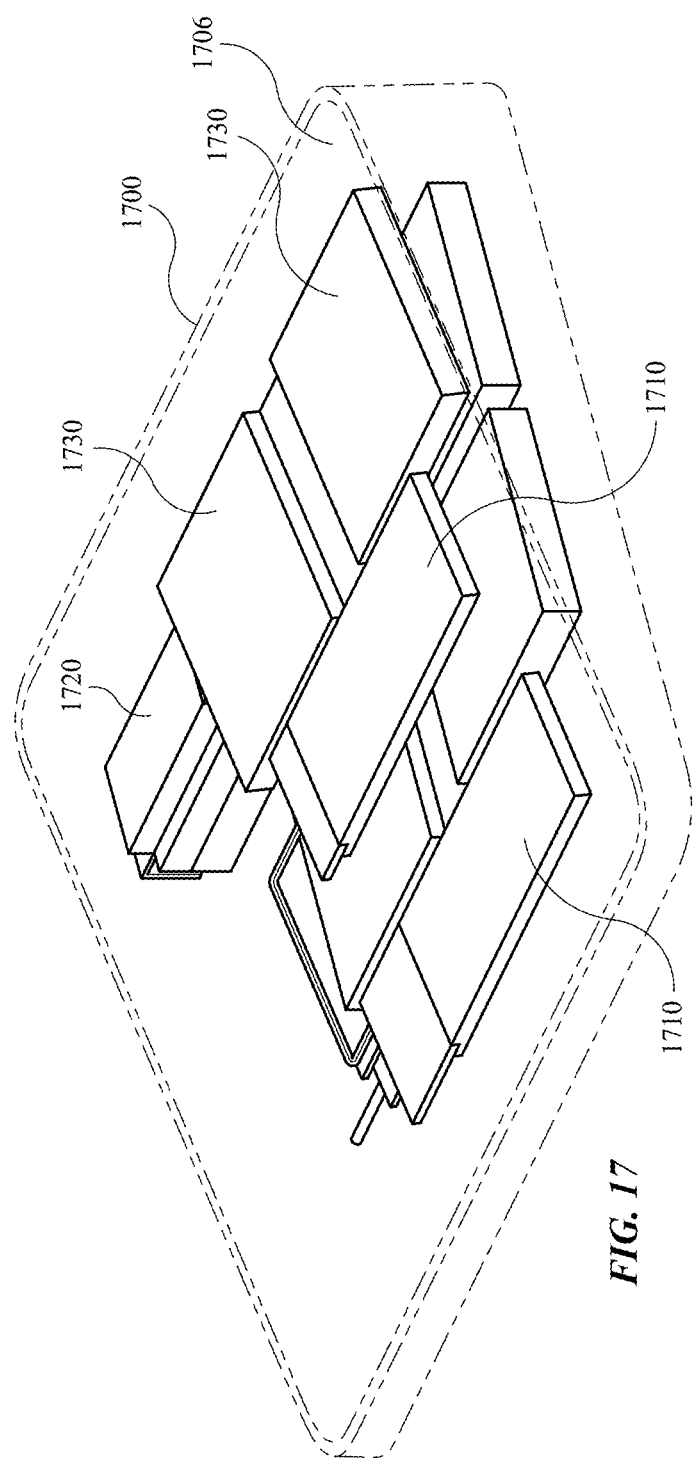
FIGS. 17 and 18 show a perspective plan view and a side plan view of a product demonstration fixture with an arrangement of batteries according to an embodiment.
Figure 18:
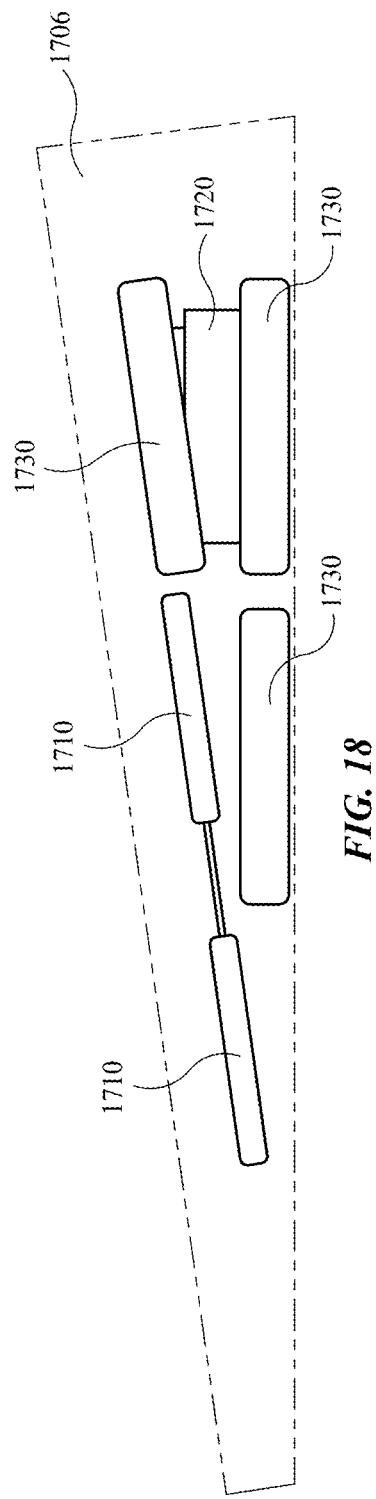

FIGS. 17 and 18 show an arrangement of batteries within a product demonstration fixture 1700 according to an embodiment. Product demonstration fixture 1700 may include an internal cavity 1706 for housing, among other things, batteries 1710, 1720, and 1730. Batteries 1710, 1720, and 1730 may have different configurations and/or capacities. For example, battery(ies) 1710 may have the smallest capacity of the three batteries, battery(ies) 1730 may have the largest capacity of the three batteries, and battery(ies) 1720 may have a capacity in between the capacities of batteries 1710 and 1730.

Figure 19:
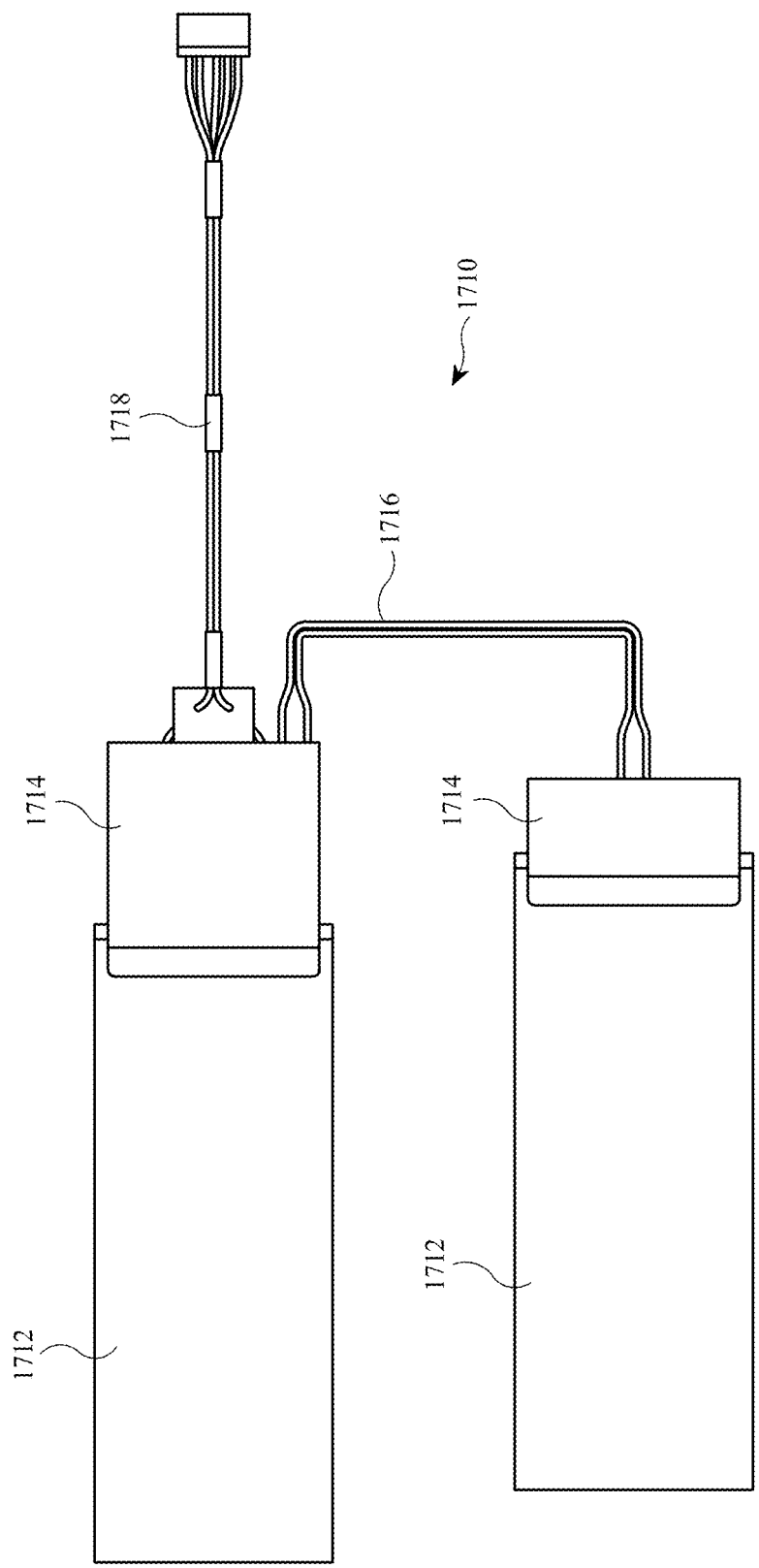
FIG. 19 shows a battery according to an embodiment.

FIG. 19 shows a battery 1710 according to an embodiment. Battery 1710 may include two battery cells 1712. Each battery cell 1712 may be coupled to a separate printed circuit board 1714. Printed circuit boards 1714 may be power management units (PMUs) configured to control battery cells 1712 (e.g., control charging, discharging, powering on/off of battery cells 1712). PMUs 1714 may be referred to as battery management units. Each printed circuit board 1714 may include one or more fuses and one or more temperature sensors. Each printed circuit board 1714 may include a processor, a memory, and one or more sensors configured to measure electrical properties (e.g., the voltage or capacity) of battery cells 1712. Printed circuit boards 1714 may be configured to communicate information about battery cells 1712 (e.g., temperature, voltage, capacitance) to an auxiliary controller (e.g., auxiliary controller 1510).

The two printed circuit boards 1714 may be connected via a battery cell connector wire 1716 configured to allow communication (e.g., the transfer of data/power) between printed circuit boards 1714. Battery 1710 may also include a cord 1718 configured to connect to a connector of product demonstration fixture 1700 (e.g., a connector 1520). Cord 1718 may transmit power to and from battery cells 1712 and transmit data to and from printed circuit boards 1714. In some embodiments, cord 1718 may be connected to one of the printed circuit boards 1714 and that printed circuit board 1714 may be configured to relay communications to and from the other printed circuit board 1714 via connector wire 1716.

Figure 20:
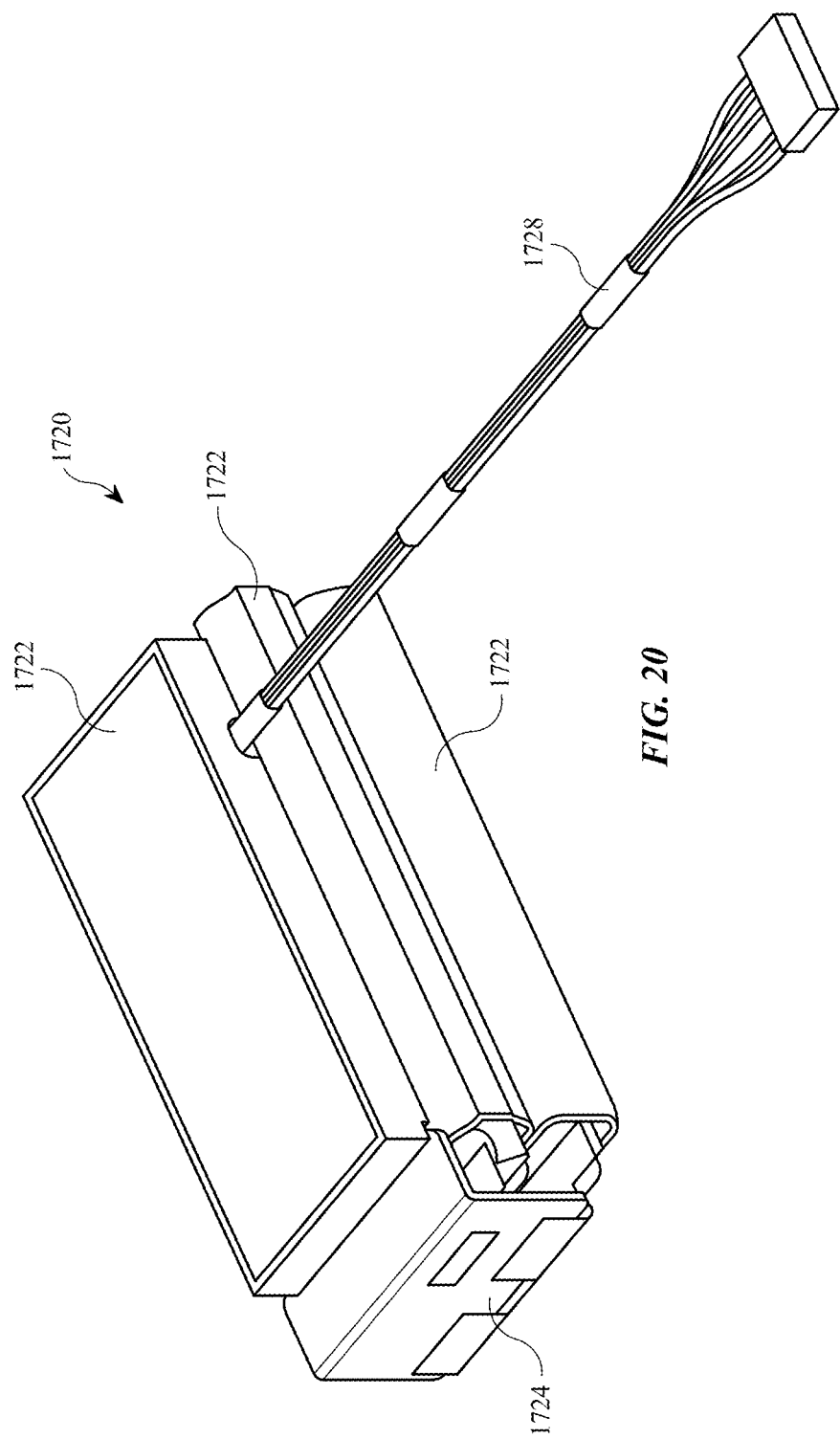
FIG. 20 shows a battery according to an embodiment.

FIG. 20 shows a battery 1720 according to an embodiment. Battery 1720 may include a plurality of battery cells 1722 coupled to a single printed circuit board 1724. Printed circuit board 1724 may be a power management unit (PMU) configured to control battery cells 1722 (e.g., charging, discharging, powering on/off battery cells 1722). Printed circuit board 1724 may be the same as or similar to a printed circuit board 1714. As shown in FIG. 20, printed circuit board 1724 may be located on one side of battery cells 1722. Battery 1720 may also include a cord 1728 configured to connect to a connector of product demonstration fixture 1700 (e.g., a connector 1520). Cord 1728 may transmit power to and from battery cells 1722 and transmit data to and from printed circuit board 1724.

Figure 21:
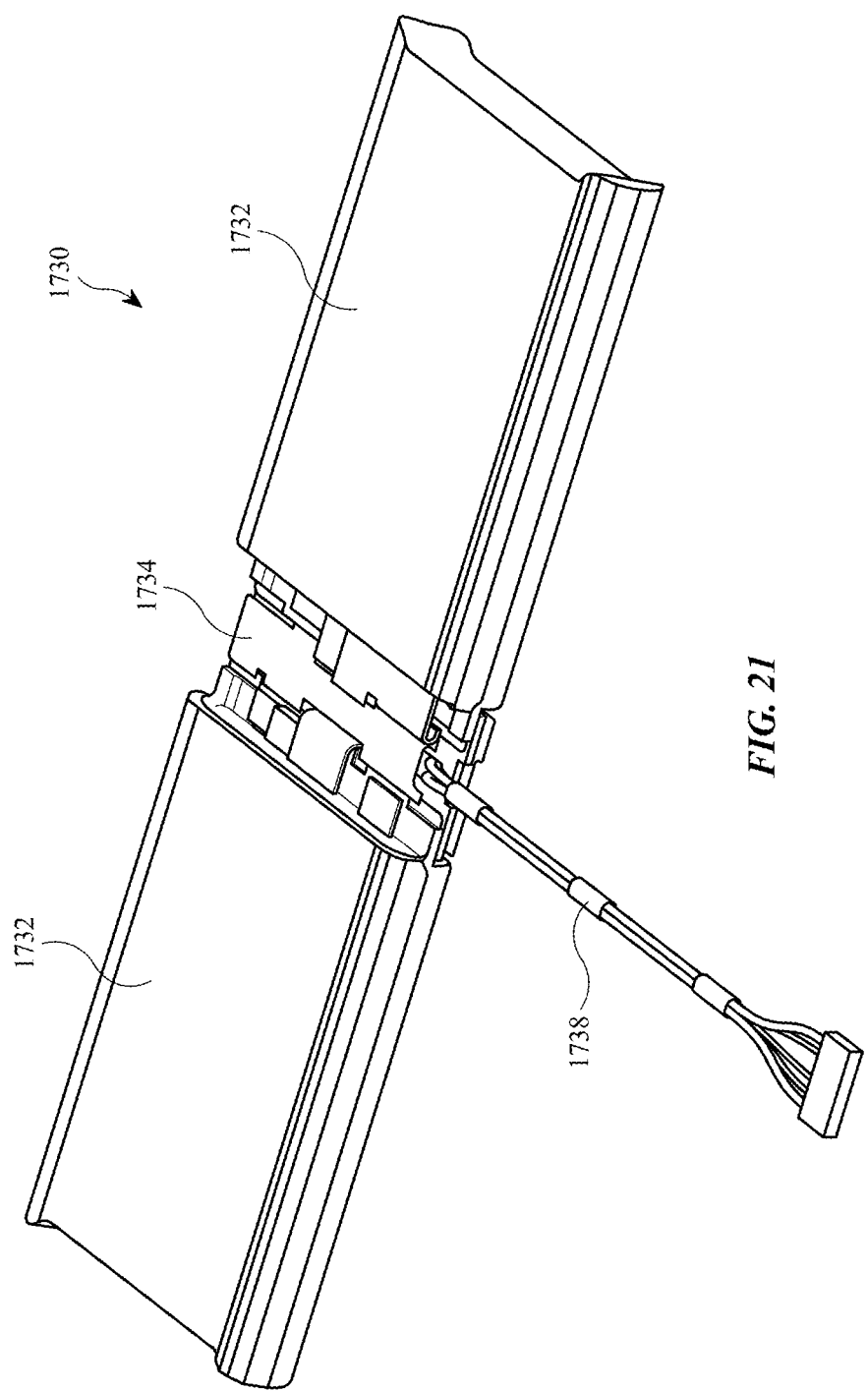
FIG. 21 shows a battery according to an embodiment.

FIG. 21 shows a battery 1730 according to an embodiment. Battery 1730 may include a plurality of battery cells 1732 coupled to a single printed circuit board 1734. Printed circuit board 1734 may be a power management unit (PMU) configured to control battery cells 1732 (e.g., charging, discharging, powering on/off battery cells 1732). As shown in FIG. 21, printed circuit board 1724 may be located between battery cells 1732. Battery 1730 may also include a cord 1738 configured to connect to a connector of product demonstration fixture 1700 (e.g., a connector 1520). Cord 1728 may transmit power to and from battery cells 1732 and transmit data to and from printed circuit board 1734.

One may appreciate that although many embodiments are disclosed above, that the operations presented with respect to methods and techniques described herein are meant as exemplary and accordingly are not exhaustive. For example, while the power management (battery control) systems/methods discussed herein are discussed in the context of a product demonstration fixture, these systems/methods may be employed with other devices powered by multiple independent batteries. For example, the power management systems/methods discussed herein may be employed to manage the charging and discharging of batteries in electric motors or computers/laptops/tablets/phones including more than one battery. One may further appreciate that alternate step order or, fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:
1. A battery control system, comprising:
   a first charger;

a second charger;
a first battery connected to the first charger;
a second battery connected to the first charger;
a third battery connected to the second charger; and
a controller,
wherein the controller controls discharge of the batteries in a discharge sequence that switches connection to an electrical load between the batteries in a sequence that does not include switching directly between batteries connected to the same charger.

2. The system of claim 1, wherein the discharge sequence includes, in order:
connecting the first battery to the electrical load through the first charger,
connecting the third battery to the electrical load through the second charger, and then disconnecting the first battery from the electrical load,
connecting the second battery to the electrical load through the first charger, and then disconnecting the third battery from the electrical load, and
connecting the third battery to the electrical load through the second charger, and then disconnecting the second battery from the electrical load.

3. The system of claim 1, further comprising a fourth battery connected to the second charger,
wherein the discharge sequence includes, in order:
connecting the first battery to the electrical load through the first charger,
connecting the third battery to the electrical load through the second charger, and then disconnecting the first battery from the electrical load,
connecting the second battery to the electrical load through the first charger, and then disconnecting the third battery from the electrical load, and
connecting the fourth battery to the electrical load through the second charger, and then disconnecting the second battery from the electrical load.

4. The system of claim 1, further comprising:
a fourth battery connected to the second charger; and
a fifth battery connected to a third charger,
wherein the discharge sequence includes, in order:
connecting the first battery to the electrical load through the first charger,
connecting the third battery to the electrical load through the second charger, and then disconnecting the first battery from the electrical load,
connecting the second battery to the electrical load through the first charger, and then disconnecting the third battery from the electrical load,
connecting the fourth battery to the electrical load through the second charger, and then disconnecting the second battery from the electrical load, and
connecting the fifth battery to the electrical load through the third charger, and then disconnecting the fourth battery from the electrical load.

5. The system of claim 1, wherein switching between batteries in the discharge sequence occurs after a battery connected to the electrical load has drained a predetermined charge amount.

6. The system of claim 1, wherein switching between batteries in the discharge sequence occurs after a battery connected to the electrical load has drained a predetermined percentage of its charge.

7. The system of claim 1, wherein at least two of the batteries have different capacities.

8. The system of claim 1, wherein charge levels of the batteries remain within a predetermined amount of percentage points of each other throughout the discharge sequence.

9. The system of claim 8, wherein the predetermined amount of percentage points is 10 percentage points.

10. The system of claim 1, wherein the discharge sequence is repeated during discharge of the batteries, and wherein the batteries are drained by the same percentage during each repetition of the discharge sequence.

11. The system of claim 1, wherein the electrical load comprises the controller.

12. The system of claim 1, wherein the electrical load comprises at least two independent electronic devices.

13. The system of claim 1, wherein the controller is configured to at least partially discharge each battery within a predetermined time period.

14. The system of claim 1, wherein the controller is configured to charge the first battery, the second battery, and the third battery with power received from a power source.

15. The system of claim 14, wherein the controller is configured to charge the first battery and the third battery at the same time.

16. The system of claim 1, wherein the controller is configured to monitor the charge levels of the first battery, the second battery, and the third battery, and wherein the controller is configured to control the switching of the batteries during the discharge sequence based the charge levels.

17. The system of claim 1, wherein the controller is configured to repeat the discharge sequence as needed to power the electrical load.

18. A retail display system comprising:
at least two independent electronic devices;
the battery control system of claim 1; and
a housing configured to be displayed on a tabletop;
wherein the at least two electronic devices are displayed by the detail display system,
wherein the battery control system is disposed within the housing, and
wherein the electrical load comprises the at least two electronic devices.

19. A battery control system, comprising:
a first charger;
a second charger;
a first battery connected to the first charger;
a second battery connected to the first charger;
a third battery connected to the second charger; and
a controller,
wherein the controller is configured to charge the first battery, the second battery, and the third battery with power received from a power source, and wherein the controller is configured to charge the third battery and one of the first battery or the second battery at the same time.

20. The system of claim 19, further comprising a fourth battery connected to the second charger, and
wherein the controller controls charging of the batteries in a charging sequence, and wherein the charging sequence includes:
connecting the first battery to the power source through the first charger,
connecting the third battery to the power source through the second charger,
disconnecting the first battery and the third battery from the power source,
connecting the second battery to the power source through the first charger, connecting the fourth battery to the power source through the second charger, and disconnecting the second battery and fourth battery from the power source.

21. The system of claim 20, wherein disconnecting batteries in the charging sequence occurs after a battery connected to the power source has charged to a predetermined charge amount.

22. The system of claim 1, wherein the controller controls discharge of the batteries to power at least two electronic devices being displayed in an interactive retail display unit, and wherein the electrical load is provided by the at least two electronic devices.

* * * * *